(12) United States Patent  
Marascio et al.

(10) Patent No.: US 8,687,789 B2  
(45) Date of Patent: Apr. 1, 2014

(54) VISUAL DESIGNER FOR TELEPHONY APPLICATIONS

(75) Inventors: Louis R. Marascio, Austin, TX (US); Adam Chaney, Austin, TX (US); James L. deCocq, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1959 days.

(21) Appl. No.: 11/449,283

(22) Filed: Jun. 8, 2006

(65) Prior Publication Data

US 2006/0242598 A1 Oct. 26, 2006

Related U.S. Application Data

(63) Continuation of application No. 10/999,888, filed on Nov. 30, 2004, now Pat. No. 7,593,980.

(51) Int. Cl.  
*H04M 7/00* (2006.01)

(52) U.S. Cl.  
USPC ...................................... 379/220.01; 709/207

(58) Field of Classification Search  
USPC ........ 709/201, 207, 223; 379/220.01, 211.01, 379/220; 717/124, 967  
See application file for complete search history.

(56) References Cited

U.S. PATENT DOCUMENTS

| | | | |
|---|---|---|---|
| 5,187,788 A | 2/1993 | Marmelstein | |
| 5,517,564 A | 5/1996 | Slater et al. | |
| 6,141,724 A * | 10/2000 | Butler et al. | 717/107 |
| 6,225,999 B1 | 5/2001 | Jain et al. | |
| 6,362,836 B1 | 3/2002 | Shaw et al. | |
| 6,363,142 B1 | 3/2002 | Stumer | |
| 7,155,426 B2 | 12/2006 | Al-Azzawe | |
| 2004/0133627 A1 | 7/2004 | Kalyanaraman et al. | |
| 2005/0276391 A1 * | 12/2005 | Ibbotson et al. | 379/88.01 |
| 2006/0023722 A1 | 2/2006 | Jung et al. | |

* cited by examiner

*Primary Examiner* — Maria El-Zoobi  
(74) *Attorney, Agent, or Firm* — Fish & Richardson P.C.

(57) ABSTRACT

An application server system is provided having a core engine connecting one or more protocol providers to one or more applications. In a preferred embodiment, the one or more applications run on a respective one or more virtual machines having their own execution threads. A thread pool may be used to spawn instances of applications or scripts. Preferably, the core engine, the protocol providers, and each of the one or more virtual machines run in separate AppDomains. In another embodiment, a visual designer is provided preferably having XML conversion capability and interactive debug capability.

16 Claims, 25 Drawing Sheets

|  | Incoming Event | App1 | App2 | App3 |
|---|---|---|---|---|
| Event Name | MyEvent | MyEvent | MyEvent | MyEvent |
| Parameter1 | 42 |  | 42 | 42 |
| Parameter2 | Red |  |  | green |

*FIG. 4A*

VISUAL DESIGNER FOR TELEPHONY APPLICATIONS

RELATED APPLICATIONS

The present application is a continuation of U.S. patent application Ser. No. 10/999,888, filed Nov. 30, 2004, now U.S. Pat. No. 7,593,980. U.S. patent application Ser. No. 10/999,888 is incorporated by reference.

FIELD

The present invention relates to platforms for developing or hosting telecommunications applications of various types.

BACKGROUND

There are a variety of computer platforms that host telephony applications. Such applications include voice mail messaging and multi-party calls, and many others. IP telephony (internet protocol telephony) applications introduce the telephone as a node on the IP network. In addition to point-to-point calling, telephones can serve as the origin or destination of a variety of network services. Further, telephones are no longer limited to voice communications or touch-tone menus. Modern IP phones sport rich interfaces with interactive touch-screen color displays.

There is, however, a limited selection of applications available for use on such phones. Such lack of applications stems partly from the expensive architectural upgrades Installing a new feature, such as voice mail, meant purchasing expensive new hardware for each circuit.

As a consequence, telephony applications appeared first at the edges of the network, in small offices or remote communities. Such proliferation helped catapult the rise of the PBX, or Private Branch eXchange, as the internal telephony interconnect within a building or organization.

A PBX originally served two purposes. First, it permitted a large number of end-users to share access to a small number of outbound lines. Second, it connected internal users without having to make a complete circuit to the telephone company and back. As the PBX became more powerful and commonplace, it began to include additional services such as call forwarding and voice mail. The increasing number of PBX vendors helped drive costs down but also resulted in each vendor utilizing proprietary systems for application development, making application development for widespread use prohibitively expensive.

Two principal issues plague application development for PBX systems. First there is the lack of standards in programming language, development environment, and signaling protocols. Communication with PBX hardware often involves closed, proprietary signaling protocols. Second, most PBX systems have extensibility and scalability problems.

In the 1980's and 1990's, the industry worked to resolve this issue with the development of a standard for telephony application development: TAPI, the Telephony Application Programming Interface. TAPI and its successor, JTAPI, (Java TAPI) are difficult to use since they required developers to have a deep understanding of the telephony switching to perform even the most basic functionality. Consequently, many developers and IT organizations avoided the standard and continued to invest in vendor-specific PBX systems.

The gradual adoption of Voice over Internet Protocol (VoIP) technologies in recent years helps reduce networking costs and potentially bridge voice and data networks. Modern VoIP PBX systems can communicate with IP telephones using the same data network shared by computers. However, such VoIP PBX systems continue to lack sufficient programmability, flexibility, and scalability. Further, modern VoIP protocols add to the number of protocols that application developers need to employ to be widely compatible.

What is needed, therefore, is a telephony application platform that enables communication over a variety of protocols with a scalable application server. What is also needed is an application development environment that enables easy development across multiple protocols for the same application platform.

SUMMARY

An application server system is provided having a core engine connecting one or more protocol providers to one or more applications. In a preferred embodiment, the one or more applications run on a respective one or more virtual machines having their own execution threads. A thread pool may be used to spawn instances of applications or scripts. Preferably, the core engine, the protocol providers, and each of the one or more virtual machines run in separate AppDomains.

In another embodiment, a visual designer is provided having a design canvas for visually building applications. The visual designer converts the applications into XML versions for installation on an application server. An assembler process is provided for to assemble and install the application. A preferred embodiment has a debug interface to the application server is provided

BRIEF DESCRIPTION OF THE DRAWINGS

FIG. 4A depicts an exemplar triggering criteria table according to one embodiment of the present invention.

DETAILED DESCRIPTION OF PREFERRED EMBODIMENTS

Figure 1:
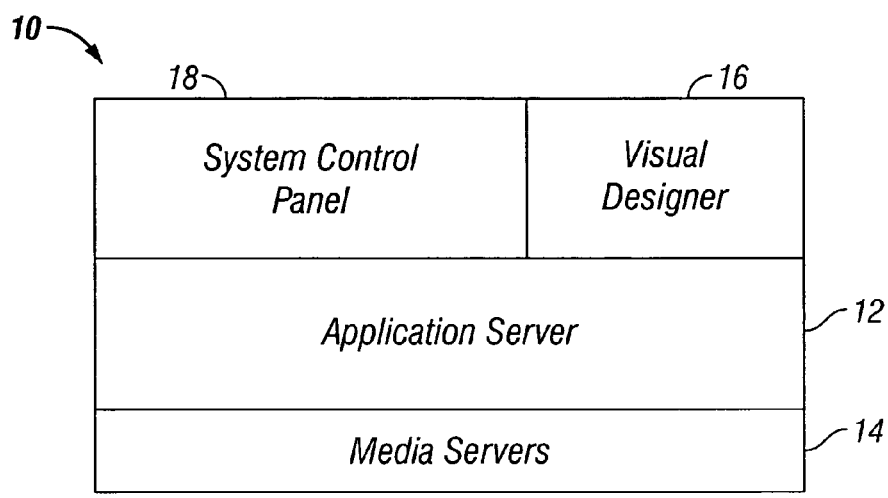
FIG. 1 depicts a high level block diagram of a communications environment according to a preferred embodiment of the present invention.

FIG. 1 depicts a high level block diagram of a communications environment according to a preferred embodiment of the present invention. The Metreos Communications Environment (MCE) 10 is a feature-rich platform for developing and hosting IP telephony applications. At the core of MCE 10 is a powerful application server 12, which controls media and external resources under the direction of custom telephony applications. MCE 10 provides control of a scalable software-based media server(s) 14 which processes, mixes, analyzes, and routes digital data such as, for example, audio data. Visual designer 16 allows developers to create complex telephony applications through a graphical design and deployment interface. System administrators manage MCE 10 through a web-based interface referred to as the system control panel 18. These items will be further described with regard to later-referenced figures.

Figure 2:
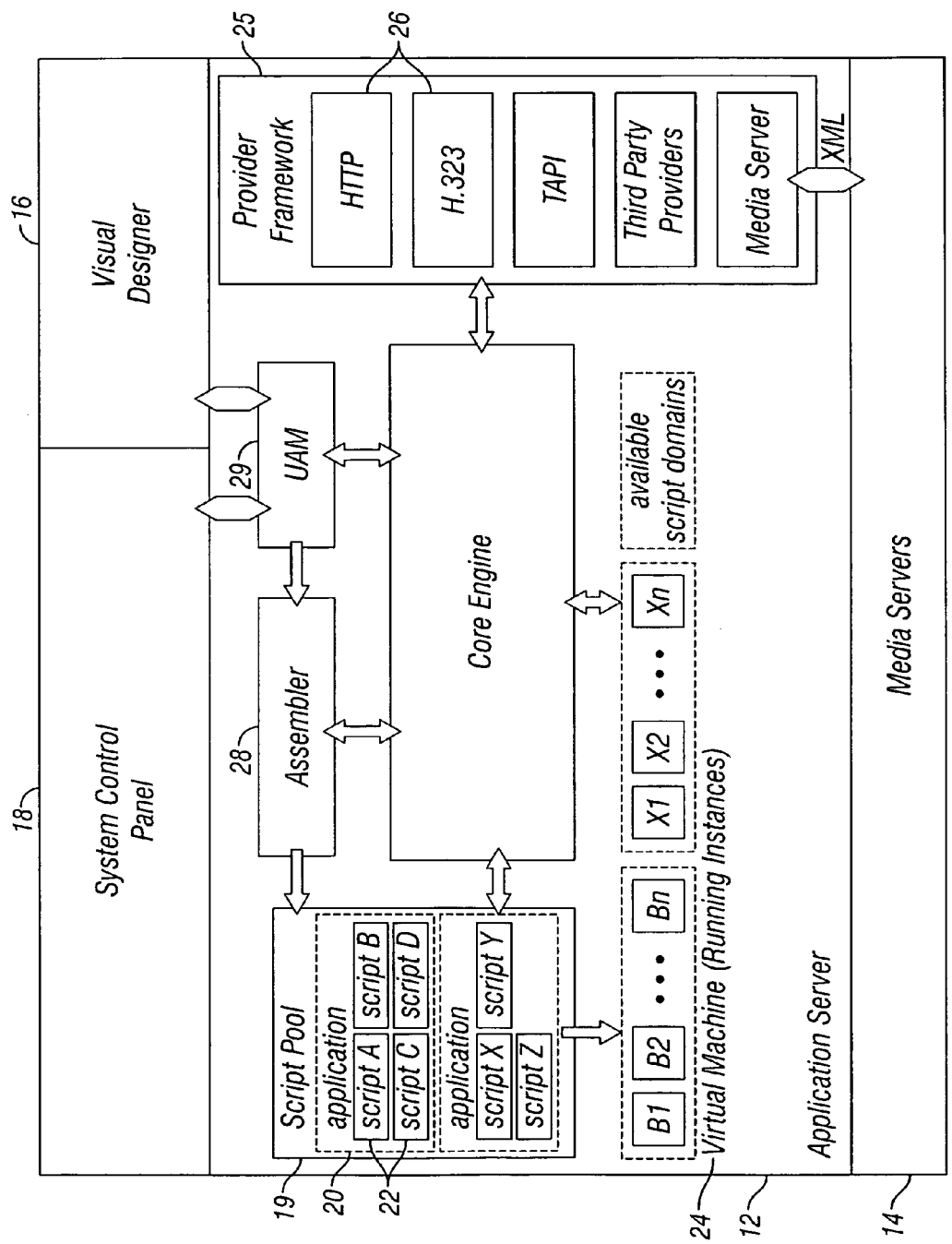
FIG. 2 depicts a block diagram showing module design of application server 12 according to a preferred embodiment of the present invention.

FIG. 2 depicts a block diagram showing module design of application server 12 according to a preferred embodiment of the present invention. Application server 12 serves as the core component of MCE 10. Within application server 12 reside all installed applications 20, which each include one or more scripts 22. Application server 12 further includes a virtual machine 24 for executing applications 20 and a provider framework 25 having a variety of protocol provider modules 26 which extend the capability of the platform to reach third-party components.

Applications 20 designed for MCE 10 reside within an application pool or script pool in application server 12. The platform provides automatic management of application state, handles side-by-side existence of varying application versions, supports seamless installation of new applications and trouble-free un-installation of any application not currently in use.

The software-based media server 14 provides the full functionality of hardware-based media servers 14 but with a pure software implementation. Inherent in this software-only design is the ability to automatically keep pace with inevitable advancements in processor speed and capabilities. Further, the design provides interoperability with standard telephony and networking protocols, such as RTP (real-time transport protocol), as well as scalability and redundancy through multiple media server 14 installations on parallel servers.

In this embodiment, each media server 14 installation supports up to 120 simultaneous connections, which equates to dozens of simultaneous user sessions spread across various applications. In this embodiment, as many as eight media servers 14 may be paired with one application server 12. Such scalability provides ability to handle additional service levels by simply adding additional media servers 14.

Preferably, media server 14 includes a variety of powerful features to enable complex telephony applications, including support for media streaming, DTMF (dual tone multi-frequency) interpretation, multi-party conferencing and recording. Other features may be included in media server 14, such as, for example, text-to-speech, speech recognition and Voice XML (extensible markup language) support. Media server 14 will be further described with regard to later referenced FIG. 27.

In this embodiment, MCE 10 simplifies the process of developing and deploying applications through use of visual designer 16. Developing an application with visual designer 16 preferably does not involve paging through extensive lines of program code, and preferably does not require a deep understanding of call control or media processing. Instead, visual designer 16 presents a graphical user interface canvas 202 (FIG. 19) where application components may be created and interconnected using a mouse or other pointing device. Finished applications can be deployed to MCE 10 via a menu selection or uploaded using the system control panel 18 as further described with regard to later referenced Figures.

Applications 20 may communicate with telephony interfaces (including voice over IP) and other communications interfaces via protocol provider modules 26. Such interfaces or modules may be third-party systems. Protocol provider modules 26 may interface over various protocols such as, for example, an H.323 provider for first-party call control, a TAPI (telephony applications protocol interface) provider for third-party call control, an HTTP provider for network communication, a Timer provider for creating event-driven delays, a Cisco DeviceListX provider for caching CallManager device information, and finally a Media server provider for communication with media server 14.

Examples of applications which may employ such protocol provider modules 26 are:

Microsoft Exchange™ Integration: Provide alerts when meeting events occur by ringing users on their mobile phones.

Instant Messaging and Collaboration Integration: Start collaborative conference calls from instant messaging sessions.

Voicemail: Provide customized, flexible voicemail services to meet individual organizational needs.

Conferencing: Employ media server 14 to support instant recordable conferencing with participant mute and kick.

Click-To-Talk: Extend a desktop PIM (personal information manager) client (such as Microsoft Outlook™) with a protocol provider 26 to enable one-click calling between parties in the PIM's address book.

Location-Based Forwarding: Integrate with enterprise IT authentication system to automatically forward incoming calls to a user's home phone, mobile phone, desk phone, or forward based on a user's presumed location from the system login trail.

Referring still to FIG. 2, in this embodiment, system control panel 18 permits administrators to manage the configuration of MCE 10, install and remove applications 20 and provider modules 26, and control other aspects of operation.

Application server 12 handles communication between components, processes user input, controls the media servers 14, and provides interfaces for the system control panel 18 and visual designer 16. The primary functional units of application server 12 are preferably grouped into subcomponents. In this embodiment, such subcomponents include script pool 19, assembler 28, OAM (operations and maintenance) module 29, provider framework 25, virtual machine 24, and core engine 27. Each element communicates with other components through a messaging infrastructure controlled by the core engine 27. Such interconnection is depicted with arrows drawn between each component and the Core engine 27.

Applications 20 within MCE 10 interact with the outside world through protocol providers 26 ("providers 26"). Providers 26 offer a family of services typically associated with a communication protocol. Providers 26 may open network ports and allow the Application Server 12 to communicate with numerous other devices on a network. For example, the HTTP provider enables applications to accept incoming web traffic and respond accordingly, or make HTTP requests to other hosts elsewhere on the network.

Providers 26 preferably execute within their own virtual process space and facilitate communication between application server 12 and external systems. Preferably, providers 26 are the sole means in which applications may execute asynchronous operations and are the only sources for unsolicited events. Such events will be further described referring to later Figures. Typically, a protocol provider 26 utilizes an underlying protocol stack and then implements an API layer to translate the action and events flowing to and from Application Server 12 's core engine 27 so they conform to a defined interface.

In this embodiment, providers 26 have two primary functions. First, they must respond to actions received from applications executing within application server 12. Secondly, they handle data received from external services and generate events to be handled by applications 20 within application server 12.

Provider framework 25 is preferably a well-defined API (application protocol interface) that enables third-party developers to build extensions to MCE 10. By implementing the interfaces defined within provider framework 25, developers may extend Metreos Communications Environment 10 to external systems or protocols.

In this embodiment, OAM module 29 handles communication with system control panel 18 and visual designer 16. Using OAM component 29, MCE 10 exposes a management API that may be employed to integrate third-party network management tools.

In this embodiment, assembler 28, working in conjunction with the core engine 27, prepares new applications 20 for use by application server 12 by distributing application components across MCE 10. This includes separating out scripts 22, databases, media resources and the installer from each new application 20, and performing initial tests for correctness and resolving any versioning issues. Scripts 20, databases, and media resources will be further described with reference to later Figures. Preferably, once an application 20 has been extracted and tested for data integrity, assembler 28 takes each script 22 contained within the application 20 and transforms the XML intermediate language into instructions executable by virtual machine 24. During this step the assembler checks the syntax of the intermediate language to ensure the script is well-formed. Assembler 28 then signals the core engine 27 that application 20 is valid. Core engine 27 then prepares any application databases. If an application installer is present, it is executed, setting up any configuration parameters for application 20 and setting default values as provided by the developer. Also, core engine 27 negotiates procurement and provisioning of any media resources, so applications 20 which need to play audio through Media servers 14 will have assured access to these files. Finally, assembler 28 passes on scripts 22 associated with application 20 to script pool 19.

Preferably, application scripts 22 reside within script pool 19 fully prepared for execution. Script pool 19 is notified by the core engine 27 when it is time to start executing a particular script 22. Core engine 27 makes this determination by comparing incoming events from protocol providers 26 with triggering criteria defined for the installed scripts 22. Once core engine 27 informs script pool 19 that an event has come in for a particular script 22, script pool 19 passes a copy of the script 22 to virtual machine 24. Such a copy is called a script instance.

Figure 3:
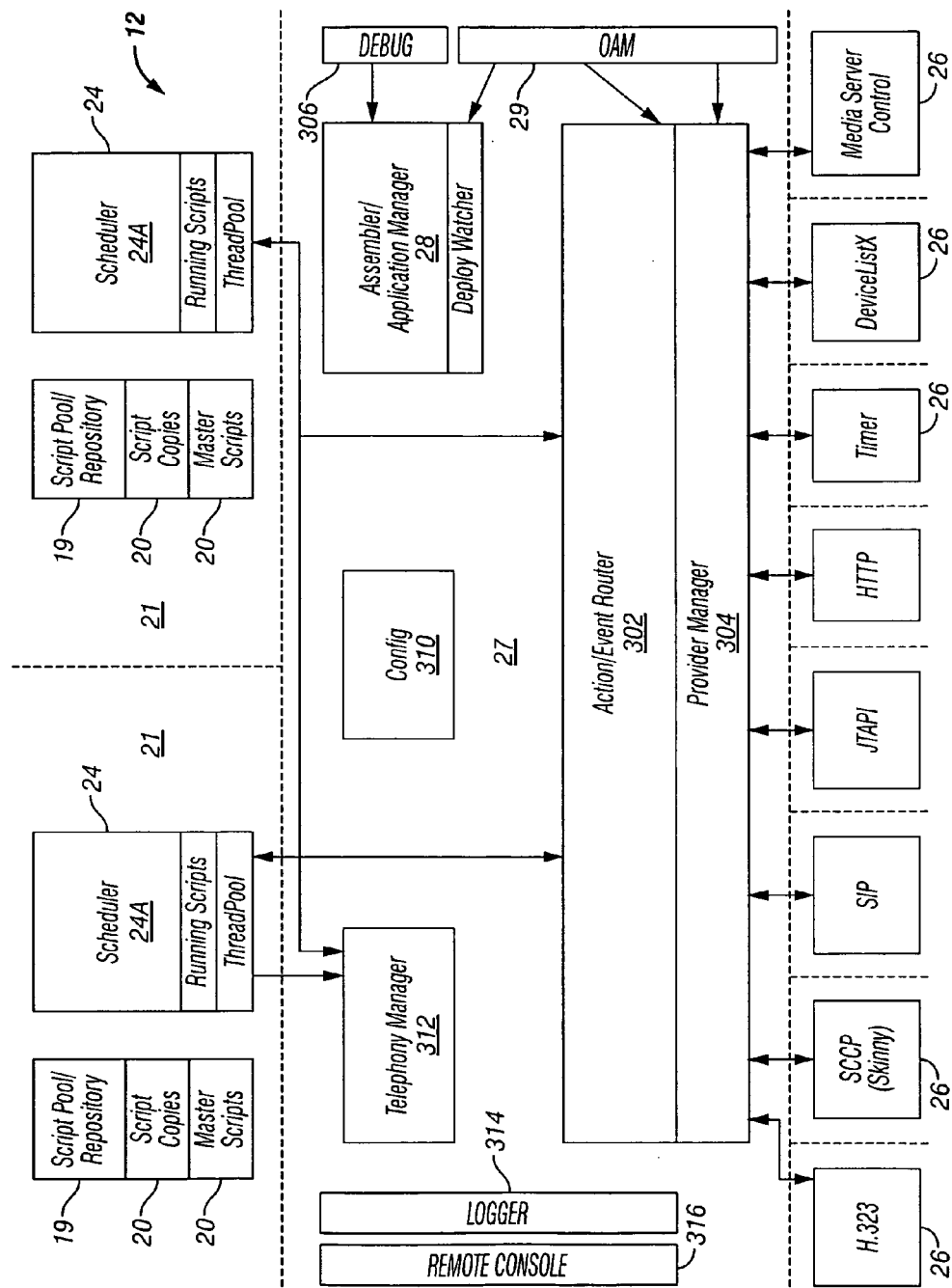
FIG. 3 depicts a block diagram of primary functional components of an application server core engine and other modules according to one embodiment of the present invention.

In this embodiment, virtual machine 24 manages the running code of any active applications 20. In a preferred embodiment, multiple instances of virtual machine 24 are employed (FIG. 3). Within the constraints of system resources, any number of scripts 22, each with any number of script instances, may be executed simultaneously. Such capability ensures that multiple applications 20 may run in parallel, and that multiple users may be accessing any one application 20 at the same time. Virtual machines 24 also ensure system stability by segmenting applications 20 from one another. This segmentation mechanism helps ensure that an unstable application 20 cannot adversely affect other applications. Preferably, once virtual machine 24 determines that an application 20 is in an unstable state, the application 20 is unloaded and will not trigger again until the problem is resolved and the application 20 is reinstalled. Other error control mechanisms may be used. For example, an unstable application 20 may be terminated but other instances allowed to run. An application error log may be used to alert administrators of applications 20 that exhibit excessive instability.

In this embodiment, all communication between components, as well as subcomponent control and resource management, occurs within core engine 27. In addition, core engine 27 preferably manages other application components.

FIG. 3 depicts a block diagram of primary functional components of an application server core engine 27 and other modules according to one embodiment of the present invention. Preferably, each boxed component represents a thread, with a few exceptions. The solid lines with arrows represent the flow of inter-thread messaging. The direction of the arrow indicates which component typically initiates the communication. The module or component receiving recipient may transfer data back in response. Implementation of such thread messaging is known in the art and may be accomplished by employing, for example, shared variables in a common address space.

In this embodiment, application server 12 is built with Microsoft's .NET development platform. The dotted lines represent AppDomain boundaries in a preferred architecture. An AppDomain is a capability of the .NET platform which enables creation of a virtual process boundary and then communicate across it. Other architectures may be used. For example, another preferred embodiment uses a similar application domain boundary capability of Java. Preferably, such architecture ensures that, if a component within an AppDomain crashes, the rest of the system remains stable. In this embodiment, the AppDomain boundaries are placed such that they isolate core engine 27 from the protocol providers 26 and applications 20.

In this embodiment, core engine 27 has provider manager 304, which is preferably a sub-component of Action/Event Router 302. Provider manager 304 is responsible for instantiating and managing protocol providers 26. Preferably, application server 12 is not limited to a particular number of protocol providers 26. Core engine 27 is typically not aware of what protocol providers 26 will be loaded. Instead, when the Application Server 12 starts, provider manager 304 searches the 'providers' directory for assemblies (preferably dynamic linked libraries, DLLs) which conform to a well-defined protocol provider API. When provider manager 304 finds a suitable assembly, it loads the assembly. Likewise, protocol providers 26 may be loaded or unloaded at any time via the system control panel 18.

Preferably, provider manager 304 is also responsible for distributing actions to the proper provider 26 by way of namespaces. For example, a provider 26 may start up and register the namespace "Metreos.Providers.H323" as its namespace. When the provider manager receives the action "Metreos.Providers.H323. MakeCall", it is programmed to send the action to the provider registered with the "Metreos.Providers.H323" namespace.

Core engine 27 and applications 20 are not typically aware of any specific protocol provider 26 API ahead of time. Protocol providers 26 preferably use attributes to describe the actions and events they can handle to applications 20 through core engine 27. Preferably, users are provided with a tool which inspects provider 26 assemblies and generates an XML file for each provider 26 which describes the provider's API based on the attributes in the code in the provider 26's assembly. Visual designer 16 then reads the XML file and generates icons for the actions and events described therein. Visual designer 16 will be further described with reference to later Figures.

Provider manager 304 also handles some basic system housekeeping such as pinging providers 26 to see if they have crashed and, if so, restarting them automatically.

Referring still to FIG. 3, core engine 27 has action event router 302. ("event router", "router"). Applications 20 specify to core engine 27 a set of criteria on which they are configured to trigger. Applications 20 preferably must trigger on an event. After an application 20 triggers, router 302 must retain state information for all instances of such application 20 so it can route all subsequent events properly until the instance terminates.

In order for router 302 to start and interact with applications 20, applications 20 must register their triggering criteria. Such registration is preferably done when application 20 is installed or application server 12 is started. Router 302 preferably keeps track of the triggering criteria in a table. Such a table preferably lists parameter values or ranges matched with certain event types and applications.

FIG. 4A depicts an exemplar triggering criteria table according to one embodiment of the present invention. The "Incoming Event" column describes the event received by router 302 for handling. The other columns describe applications 20 which are registered to handle various permutations of this event. Preferably, router 302 may only select one application 20 to trigger, so it will pick the best match. In a preferred embodiment, router 302 chooses the best match as being the application that has the most matching parameters to the trigger event, and has no mismatching parameters.

For example, the best match for the incoming event in FIG. 4A is App2 because it has more matching parameters than App1, and App3 has a mismatched parameter. In this exemplar, if App2 did not exist, App1 would be triggered since it would have the most matching parameters without any mismatches. Other application triggering algorithms may be used.

Figure 4B:
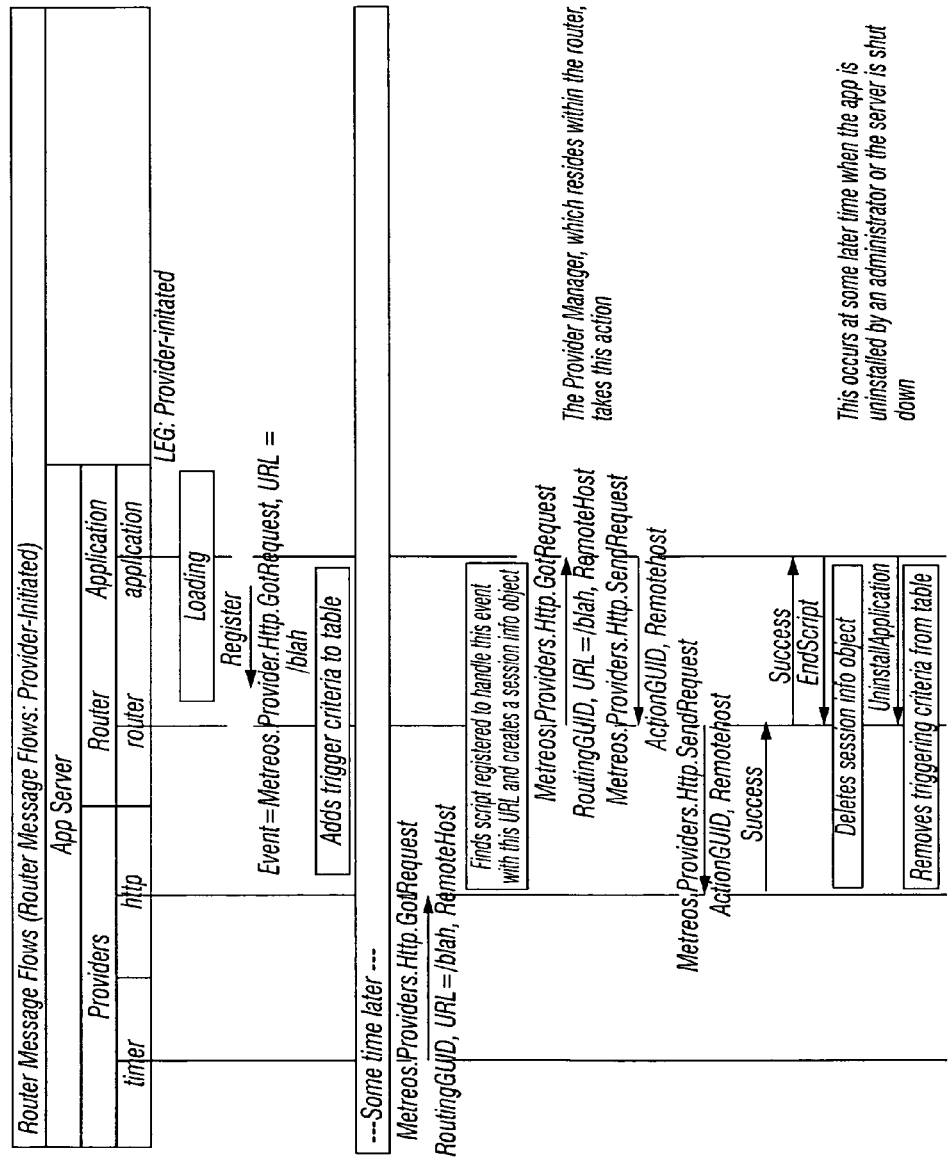
FIG. 4B depicts a messaging flow diagram according to one embodiment of the present invention.

FIG. 4B depicts a messaging flow diagram according to one embodiment of the present invention. In this exemplar diagram, an application 20 first registers its triggering criteria with router 302. Some time later, a protocol provider 26 initiates a session. When an HTTP message is received on the HTTP stack, the provider creates a "GotRequest" event with all the associated parameters and a newly-generated Routing GUID (globally unique identifier) and sends it to router 302.

In this example, router 302 does not yet recognize the Routing GUID, so it matches the event to an application 20 based on the criteria specified in its routing tables (FIG. 4A). Router 302 then forwards the event to the virtual machine 24 where the selected application 20 resides. The selected virtual machine 24 ("virtual machine", "application runtime", "application runtime environment") then creates a new instance of the script 22, seeds it with the incoming event information, and begins executing it. Virtual machine/application runtime 24 will be further discussed below.

At some point in script 22's execution, it decides to send an action to the HTTP provider 26. Preferably, the application 20 is not limited to using only the provider 26 which triggered it. Since the action is routed based on namespace, the application may issue actions to any and all providers it wishes. In this example, application 20 sends an action to HTTP provider 26. Provider manager 304 matches the namespace and forwards the action. Typically a provider 26 is obligated to send a response to any received actions. In this case, provider 26 sends "Success".

As another exemplar, if provider 26 were to send some other event which needed to go to this script 22 instance, it would reuse the same Routing GUID. In preferred embodiments, when router 302 receives an event with a Routing GUID it has seen before, it forwards the event on to the corresponding script 22 instance previously associated with the GUID.

In this exemplar, when script 22 has finished everything it needs to do, it terminates itself with an "EndScript" action. This action signals application runtime 24 to reset all session state associated with this script instance, return it to the script pool 19, and send a message to router 302 indicating that the script is no longer running. When router 302 gets the message that script 22 is ended, it removes all session-related information from its routing tables, but it retains the triggering information so it can start new instances of script 22. Preferably, only when the application 20 is uninstalled does router 302 remove the triggering criteria for each of the application 20's scripts 22 from the routing tables.

Figure 4C:
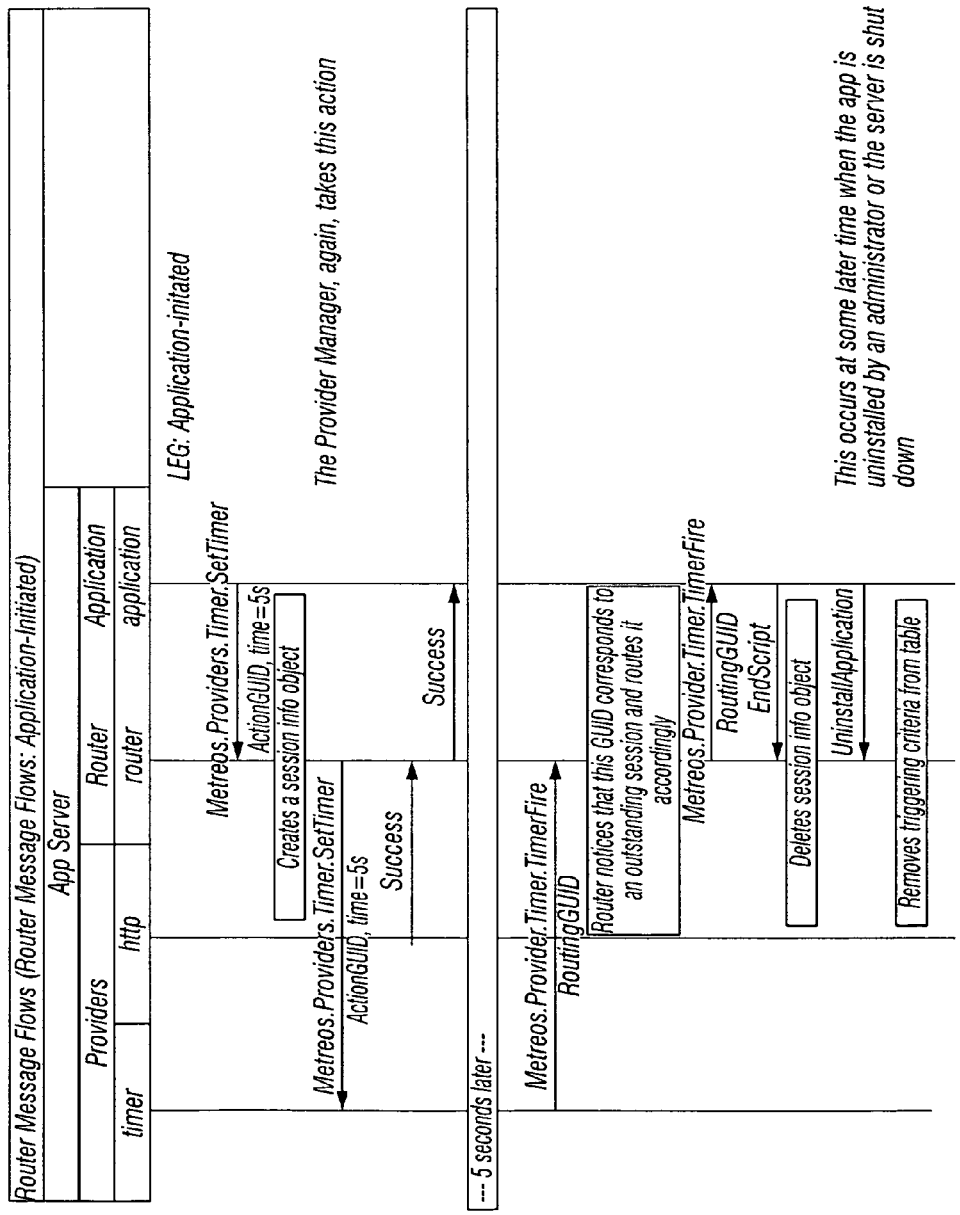
FIG. 4C depicts another messaging flow diagram according to one embodiment of the present invention.

FIG. 4C depicts another messaging flow diagram according to one embodiment of the present invention. In this exemplar, an application 20 initiates the communications session. In such a case, the provider preferably must store the Routing GUID, which is mechanically derived from an Action GUID associated with action from application 20. Such a routing ID is for use in subsequent events destined for the script 22 instance which generated the Action. This scenario may occur if a script 22 is triggered by an event from another provider 26 in application server 12. In this case, multiple providers 26 may be sending events with the exact same Routing GUID. Router 302 forwards them all to the script 22 instance in the same way.

Referring again to FIG. 3, in this embodiment, administrators can configure application partitions, which are sets of data associated with a particular application 20. Once an application 20 is installed, a default application partition is created. That partition contains the triggering information for each script 22 in the application 20 as specified at design time. Preferably, an administrator may then change or augment the triggering parameters. The triggering event name, however, preferably cannot be modified. Further, the administrator may specify a call control protocol to use when a script 22 triggered by the criteria in this partition wishes to use call control services. Examples of such protocols are H.323, SCCP, CTI (JTAPI), and SIP. Other protocols may be included if appropriate protocol providers are configured on application server 12.

Configuration (config) component 310 is preferably a singleton class (not a thread) which exposes methods which are called directly by nearly all components in application server 12. The config class acts as the core engine 27's gateway to a system config database. The config class is preferably the only component which has access to the config database. Such a scheme helps ensure that all database operations are thread-safe, atomic, and maintain referential integrity.

As an exemplar, when a provider 26 loads, it may wish to advertise a configuration value that an administrator can use to adjust provider 26's behavior. In such a case, provider 26 (by way of a standard base class) makes a call to the config class which tells it to add the config item. The config class then updates one or more database tables, keep track of database locks, and otherwise manage addition of the configuration item.

Referring still to FIG. 3, in this embodiment, telephony manager 312 is interconnected with more than one virtual machine 24. Other embodiments may have only one. Telephony manager 312 exposes a common API, preferably referred to as the CallControl API, for all call-control stacks in use with application server 12. The CallControl API specifies a specific set of actions and events which a provider 26 must be able to handle in order to utilize telephony manager 312.

As discussed above, providers 26 may define their own API which identifies the actions and events they can handle. In this embodiment, providers 26 which conform to the CallControl API implicitly declare all the actions and events contained in the CallControl API and thus only explicitly declare any actions or events which are proprietary to that provider 26. Preferably, providers indicate that they wish to participate with the CallControl subsystem using a special flag when they register their namespace at load time. When Provider Manager 304 sees that a provider 26 has elected to participate in the CallControl subsystem, it notifies the Telephony Manager 312, so it will know how to handle CallControl actions which are destined for the type of call control protocol specified.

In this embodiment, the application runtime 24 is programmed to forward all actions with the namespace "Metreos.CallControl" to telephony manager 312. Likewise, router 302 forwards all events with the namespace "Metreos.CallControl" to the telephony manager 312. Such a namespace represents a generic telephony service and other namespaces and access schemes may be used. When the telephony manager 312 receives an action, it looks up what call control protocol is configured for the application partition that sent this action. It then looks to see if a provider 26 has registered as a handler for that protocol. Once the associated provider 26 and its real namespace are identified, the telephony manager 312 translates the action name so it will be routed to the configured provider and then sends the action on to Provider Manager 304.

As an exemplar, an action is received by the telephony manager 312 having parameters with values as follows:
Action=Metreos.CallControl.MakeCall,
AppPartition=NewYork,
To=5124377913@callmanager.mycompany.com. The telephony manager 312 finds that the control protocol configured for the destination application's partition is H.323. A provider 26 registered as "Metreos.Providers.H323" claims to handle this protocol. So the telephony manager 312 translates the action to:
Action=Metreos.Providers.H323. MakeCall. Telephony manager 312 leaves the rest of the parameters as they were and forwards the action to Provider Manager 304 for routing to the H.323 provider.

The telephony manager 312 preferably has the capability to handle an almost infinite number of possible combinations of actions and events and force them to conform to the common API. To provide such capability, this embodiment has a telephony manager 312 implemented as a script engine. Preferably, the telephony manager 312 script engine is hard-coded with handlers for the well-defined, finite set of actions which can appear in scripts 22 so no input parameters are necessary. Telephony manager 312 script engine keeps track of all the data it knows about a given call and includes as much relevant information as possible in the actions and events it generates.

In this embodiment, a scripting language is provided to for programming telephony manager 312. Preferably, the scripting language provided is a state description language. A high-level definition of such scripting language is provided in several following tables. The language described is merely exemplary and other languages containing other syntax or features may be used to implement a telephony manager 312 in other embodiments.

Table 1 contains a list of the valid tags which can be used to start any line in a state description. Table 2 contains a syntax definition for the tags listed in Table 1. Table 3 contains the order in which next state conditions are evaluated by the execution engine. Usage recommendations follow each condition.

Table 4 contains preferred valid values for the data field. The field type follows the name in parenthesis. For uint fields, any uint value can be specified after the comparator (= or !=). For bool values, true or false can be specified. All other values can only be compared to null.

TABLE 1

| Tag: | Function: |
|---|---|
| trigger | Declares the triggering action or event for the script |
| a | Action declaration. There can be only one |

TABLE 1-continued

| Tag: | Function: |
|---|---|
| rns | Response Next State. Can use * wildcard to indicate any response |
| ens | Event Next State |
| ans | Action Next State |
| dns | Data Next State |
| def | Default next state. Only one allowed |
| timeout | Next state on timeout. Only one allowed |

TABLE 2

Syntax:
event:[event name]
a:[action name]
(rns | ens | ans ):[expected value]–>[next state ID]
dns:[field name] (= | !=) [field value]–>[next state ID]
def–>[next state ID]
timeout:[number of seconds]–>[next state ID]

TABLE 3

| Priority: | Notes: |
|---|---|
| 1. Responses | Use only with timeout |
| 2. Actions | Do not combine with responses, data, or ault. Use timeout |
| 3. Events | Do not combine with responses, data, or default. Use timeout |
| 4. Timeout | Use only with responses, actions, and/or events |
| 5. Data | Use only with default |
| 6. Default | Use only with data |

TABLE 4

| Data Field: | Valid values for data fields: |
|---|---|
| callId | string |
| peerCallId | string |
| mmsId | string |
| connectionId | string |
| localMediaCapsSet | complex custom collection |
| remoteMediaCaps | complex custom colleciton |
| txAddr | IPEndPoint |
| txCodec | string |
| txFramesize | uint |
| rxAddr | IPEndPoint |
| rxCodec | string |
| rxFramesize | uint |
| waitForMedia | bool |

Figure 4D:
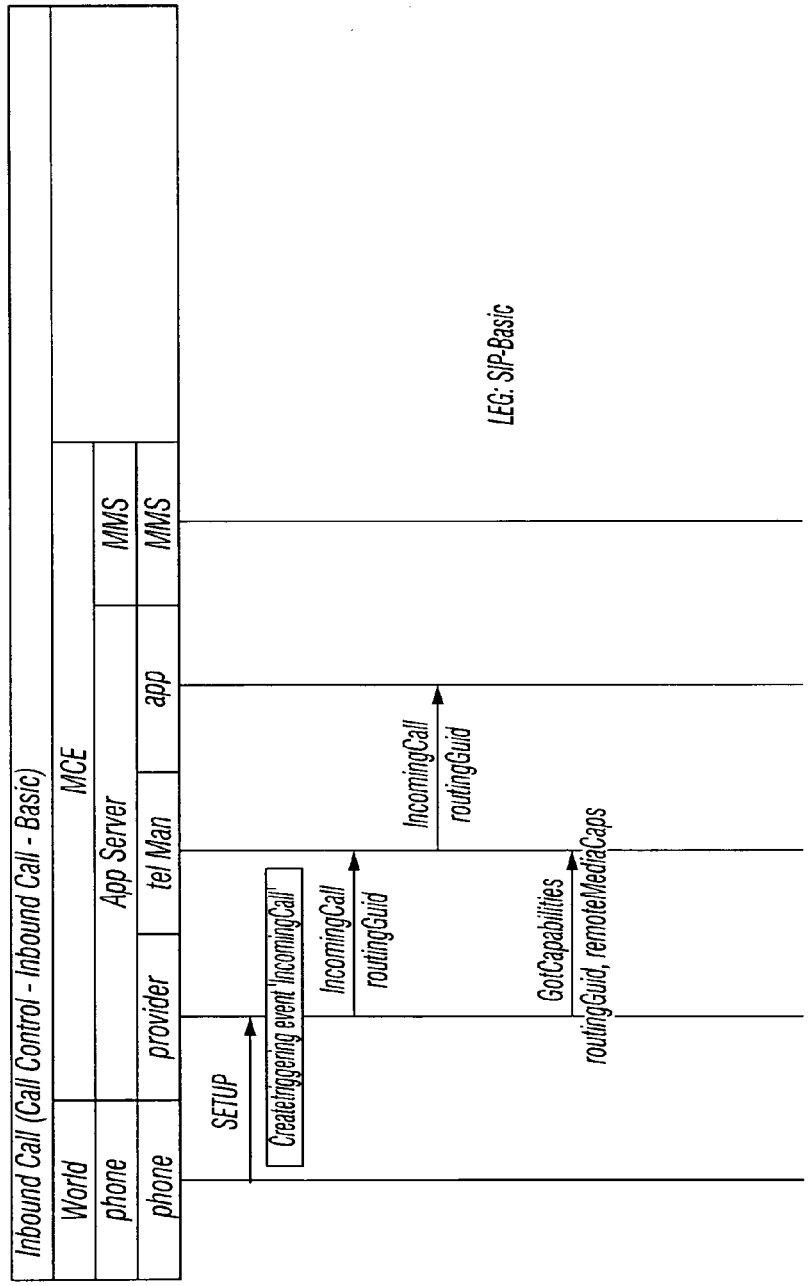
FIG. 4D depicts a call messaging flow chart of a SIP (session initiation protocol) call setup according to one embodiment of the present invention.

FIG. 4D depicts a call messaging flow chart of a SIP (session initiation protocol) call setup according to one embodiment of the present invention. Table 5 depicts a script designed for telephony manager 312 to implement the SIP call setup depicted in FIG. 4D.

TABLE 5

```
 1   trigger:Metreos.CallControl.IncomingCall
 2
 3   1
 4   a:ForwardEventToApp
 5   ens:GotCapabilities–>5
 6   ans:AnswerCall–>[IncomingCall_LateMedia]
 7
 8   5
 9   a:GetMediaCaps
10   rns:success–>10
11   rns:*–>205
12
```

TABLE 5-continued

```
13   10
14   a:SelectTxCodec
15   def–>15
16
17   15
18   a:SetMedia
19   rns:success–>20
20   rns:*–>205
21
22   20
23   a:Wait
24   ans:AnswerCall–>25
25
26   25
27   a:AcceptCall
28   rns:success–>30
29   rns:*–>205
30
31   30
32   a:ReserveMedia
33   rns:success–>35
34   rns:*–>205
35
36   35
37   a:SetMedia
38   rns:success–>40
39   rns:*–>200
40
41   40
42   a:ForwardActionToProvider    // Forwards AnswerCall
43   rns:success–>41
44   rns:*–>46
45
46   41
47   a:Wait
48   dns:waitForMedia=false–>45
49   def–>50
50
51   45
52   a:ForwardResponseToApp
53   def–>50
54   ans:Hangup–>90
55
56   46
57   a:ForwardResponseToApp
58   def–>200
59
60   50
61   a:Wait
62   ens:MediaEstablished–>55
63   timeout:10–>200
64
65   55
66   a:CreateConnection
67   rns:success–>60
68   rns:*–>200
69
70   60
71   a:SendStartTxToApp
72   def–>65
73
74   65
75   a:ForwardResponseToApp
76   def–>70
77
78   70
79   a:SendStartRxToApp
80   def–>75
81
82   75
83   a:Wait
84   ens:Hangup–>80
85   ans:Hangup–>90
86
87   80
88   a:DeleteConnection
89   rns:*–>85
90
91   85
92   a:ForwardEventToApp
```

TABLE 5-continued

| | |
|---|---|
| 93 | def->1000 |
| 94 | |
| 95 | 90 |
| 96 | a:DeleteConnection |
| 97 | rns:*->95 |
| 98 | |
| 99 | 95 |
| 100 | a:ForwardActionToProvider |
| 101 | rns:*->100 |
| 102 | |
| 103 | 100 |
| 104 | a:ForwardResponseToApp |
| 105 | def->1000 |
| 106 | |
| 107 | 200 |
| 108 | a:DeleteConnection |
| 109 | rns:*->205 |
| 110 | |
| 111 | 205 |
| 112 | a:SendHangupToApp |
| 113 | def->210 |
| 114 | |
| 115 | 210 |
| 116 | a:HangupCall |
| 117 | rns:*->1000 |
| 118 | |
| 119 | 1000 |
| 120 | a:End |

Referring again to FIG. 3, in this embodiment, application server 12 has an assembler/application manager 28 for installing and configuring applications 20. Assembler 28 will be further described with reference to later Figures.

In this embodiment, application server 12 has a management interface 308. Preferably, management interface 308 listens on a socket and accepts TCP connections from system control panel 18 (FIG. 1). Control panel 18 uses this interface primarily to notify core engine 27 of changes to the Application Server 12 configuration via XML messages. In a preferred embodiment, management interface 308 exposes the following functions:

Execute provider extensions (proprietary methods published by providers at load-time.)
    Enable/Disable Applications
    Install/Uninstall Applications
    Enable/Disable Providers
    Install/Uninstall Providers
    Add/Remove Media Servers
    Add/Remove CallManager clusters
    Add/Remove Log Sinks Referring still to the preferred embodiment depicted in FIG. 3, application server 12 has virtual machines 24. Virtual machine 24 is the component that starts, executes, terminates, and manages application script 22 execution. Virtual machines 24 execute inside a child AppDomain 21, indicated on the diagram as bordered by dotted lines. The diagram shows two copies of virtual machine 24 for exemplar purposes. In a preferred embodiment, there are as many virtual machines 24 on an application server 12 as there are applications 20 installed on that application server 12. When there are no applications installed, there are no virtual machines 24 present. There is preferably no set limit to the number of applications (and thus virtual machines 24) which may be loaded. Virtual machines 24 will be further described with regard to later referenced Figures, especially FIGS. 15 and 16.

The embodiment in FIG. 3 also has a logger component 314 to manage log messages. Preferably, logger 314 is closely tied to .NET tracing functions and uses .NET trace listeners to route log messages to various log sinks based on configurable criteria. Another preferred embodiment uses a Java implementation. The log sinks included with the Application Server 12 are preferably as follows:
    Console Logger (writes logs to the console (stdout))
    File Logger (writes logs to a file)
    Event Logger (writes log to the Windows event log)
    Remote Console (writes logs to any number of TCP connections)
    Debug Logger (writes logs to the Windows debug queue.)

The list of log writers is preferably extensible. A new logging assembly which implements a well-defined log sink interface may be deployed via the system control panel 18 management website. The website places the assembly into a configured directory and the Application Server 12 startup process picks it up via a directory watcher and installs it.

Figure 5:
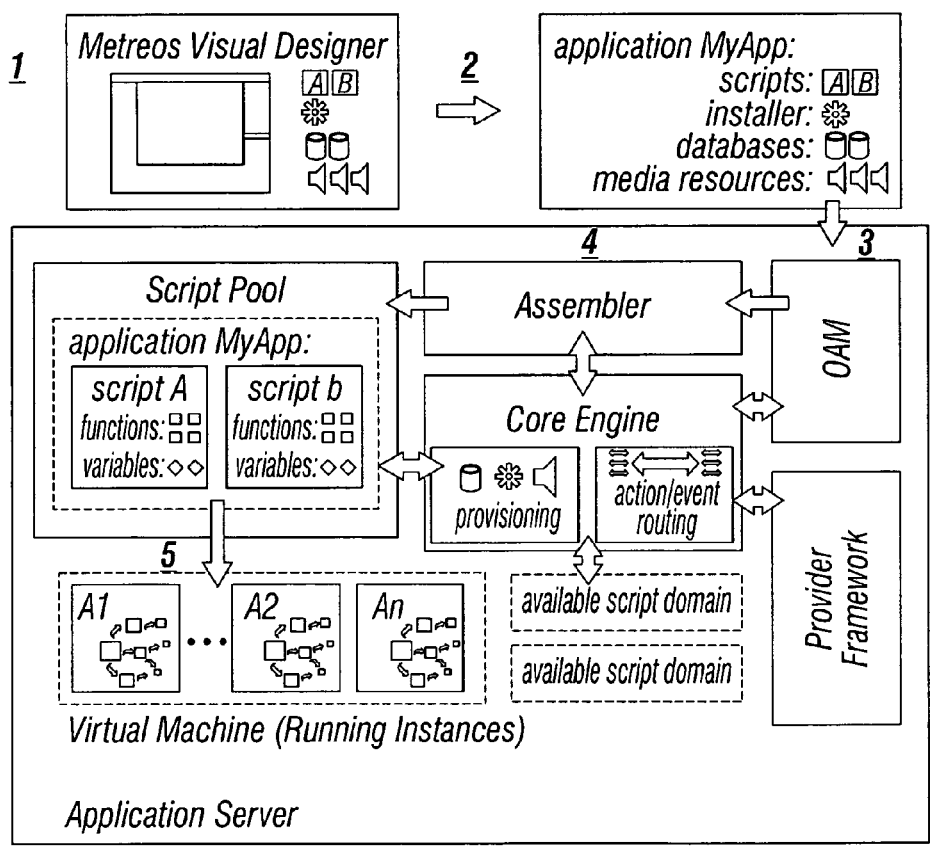
FIG. 5 depicts a flow chart showing an application lifecycle according to one embodiment of the present invention.

FIG. 5 depicts a flow chart showing an application lifecycle according to one embodiment of the present invention. Applications 20 typically begin their existence in the integrated development environment of visual designer 16. As an application evolves, developers will iteratively test the program by compiling and executing the application 20. MCE 10 provides a process having, in this embodiment, five distinct steps, which are described here as an overview and later further detail.

In step 1, development, application is created in visual designer 16 development environment. In step 2, build, visual designer 16 prepares application for use by converting diagrams into a proprietary XML-based intermediate language, and then compiled code and additional application data (such as media resources, an installer, and any needed databases) are combined into a single archive file. In step 3, deployment, the archive file is uploaded to application server 12, either through system control panel 18 or via direct deployment in visual designer 16. In step 4, installation, the archive is unpackaged and resources are allocated to handle all components of the new application 20. Application scripts 22 are copied into script pool 19 where they wait for events. In step 5, execution, application server 12 processes the application 20 generated from the user's initial design.

Each of these five steps occur in different locations throughout the MCE 10 platform. Some steps may involve two or more components.

Referring still to the embodiment depicted as a flow chart in FIG. 5, an application 20 preferably begins its existence (step 1) in visual designer 16 where the application logic is formed. Visual designer 16 will assist the programmer by applying certain rules automatically to ensure that applications 20 are well-formed. For example, if a developer drops an action on the canvas which generates callback events, visual designer 16 will automatically generate functions for the developer to use when implementing those event handlers. Development in visual designer 16 will be further described referring to later Figures.

Once the developer has completed application 20, or completed enough application components to test some aspect of functionality, they instruct visual designer 16 to "build" or compile application 20 (step 2). Such building converts application 20's representation as data and logical flow from a visual representation of boxes and arrows to a linear description in an XML-based proprietary intermediate language. Functions which lack proper exits, un-initialized variables, or unspecified execution paths will all cause errors to appear during compilation.

In this embodiment, after the application 20 is successfully compiled into XML, all XML code and other application components are packaged into a single unified archive file. Such a packaging process simplifies transporting applications 20 and related data by rolling everything into a single file, including databases, media resources, installer information, the application, custom code, and related versioning data. In a preferred embodiment, the archive files retain the extension .MCA, for Metreos Communications Archive. Packaging may be accomplished through visual designer 16, or through a packager command line tool.

Packaging errors can occur when the additional resources such as installers, databases, custom code and media resources appear malformed or contain conflicting information. While the packager typically cannot catch all possible errors, many types of resource problems can become evident during step 2.

Referring to deployment (step 3), packaged archives are preferably installed to the application server 12 either through visual designer 16 or system control panel 18. Application server 12 receives the archive through OAM component 29, which handles all configuration and administrative communications. OAM component 29 in turn routes the complete package to the assembler 28, which unpacks the contents and routes individual components throughout application server 12. Assembler 28 prepares a memory map (an executable version of application 20) using an assembly process described in more detail later.

The installation or assembly step (step 4) unpacks the archive file and prepares its elements for provisioning throughout the system. Any databases in the package arrive in the core engine 27, which determines based on versioning data whether or not existing databases from previous installations will affect this install. Then, core engine 27 attempts to create or update the data and schemas defined by the new application 20. Such a creation process could return database creation errors which result from malformed SQL (structured query language), or resource allocation problems from overloaded application servers 12. Preferably, installers are routed to core engine 27 and immediately processed. Syntax errors or unsupported installer commands generate errors, which are then returned to the user through OAM component 29.

During installation, media resources are preferably likewise passed along to core engine 27. Core engine 27 in turn contacts the media servers 14 associated with the respective application server 12. To ensure optimum performance, all such media resources are preferably installed on each media server 14 in the particular MCE 10. In another embodiment, media files may be stored on a centralized repository or file server. Core engine 27 may report problems if the media servers 14 lack sufficient resources to store the media files, or if the server(s) are not reachable.

In this embodiment, script pool 19 registers each script 22 with core engine 27 in order that appropriate incoming events can initiate script execution. This registration process ends the Installation Phase.

In step 5, each time an event fires whose event signature matches a script 22's triggering event signature, the corresponding script 22 is executed by virtual machine 24. Any number of instances of the same script 22 may be created, within configuration and resource limitations. Each instance maintains separate memory storage and distinct access to resources.

During execution, any detected runtime or logic errors are preferably logged in an application server log. When a script instance finishes execution, relevant state information is reset and it returns to script pool 19 awaiting the next triggering event. Other embodiments may work with temporary copies of scripts 22.

Figure 6:
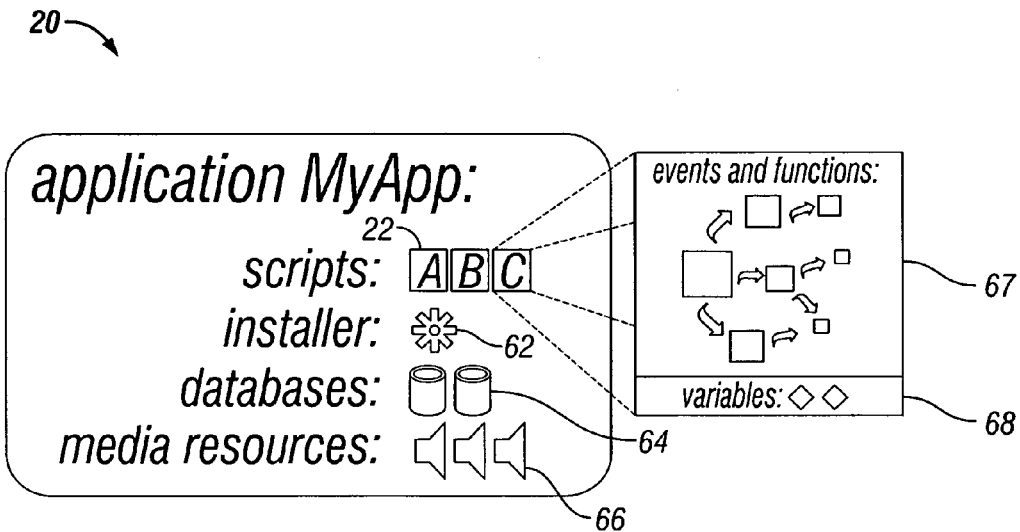
FIG. 6 depicts a block diagram of the structure of applications within the Metreos Communications Environment according to one embodiment of the present invention.

FIG. 6 depicts a block diagram of the structure of applications within MCE 10 according to one embodiment of the present invention. Applications 20 preferably contain a wide variety of elements, organized according to strict architectural requirements. Applications 20 within MCE 10 are typically referenced by name. The application name provides basic descriptive information to users and developers of the nature and capabilities of the application service.

In this embodiment, each application 20 consists of up to four types of components: scripts 22, an installer 62, databases 64, and media resources 66. The latter three component types are optional and may be included in any combination to meet an individual application 20's requirements.

Preferably, all application logic either occurs within scripts 20, or is directed by scripts 20. Use of scripts 20 gives programmers the ability to alter execution paths with control structures 67, store data in script-wide or function-scope variables 68, access external resources, and indirectly accept input from users.

An application may have a single installer 62 containing instructions to direct installation. In a preferred embodiment, installer 62 is represented as an XML configuration file, which preferably is automatically prepared by the visual designer 16 upon request. Application developers may wish to include special instructions to MCE 10 regarding the desired setup and deployment of their services. Such instructions may concern requirements like dependencies on external protocol providers 26, configuration settings, and licensing restrictions.

Databases 64 provide applications 20 ability to retain data beyond the execution of an individual script 22. Applications 20 within MCE 10 may include any number of associated SQL (structured query language) databases 64 which enable developers to store relational data in application 20. Information stored within databases 64 persists across any downtime periods or other connectivity issues which can occur, making databases 64 particularly useful for storing long-term data such as call records, access permissions and other general storage items.

MCE 10 preferably has an embedded SQL engine designed for high-speed retrieval of data for use in high-performance telephony applications. For applications requiring report generation, integration with existing databases, or other advanced database features, MCE 10 may also provide connectivity to remote data stores through an external collection of classes such as ADO.NET (activeX data objects) classes, in addition to using the embedded database engine. Such connectivity is provided in another preferred Java embodiment with the JDBC API (Java Database Connectivity).

Media resources 66 contain data regarding media items such as audio prompts. Examples of such media resources are pre-recorded greetings, error messages, and status messages. MCE 10 lets developers bundle any necessary audio prompts with an application, easing the deployment process further. Preferably, media resources 66 are .vox or .wav files. Any number of files may be included within an application 20. In a preferred embodiment, such files are 8 bit/8 khz, to maximize performance.

Figure 7:
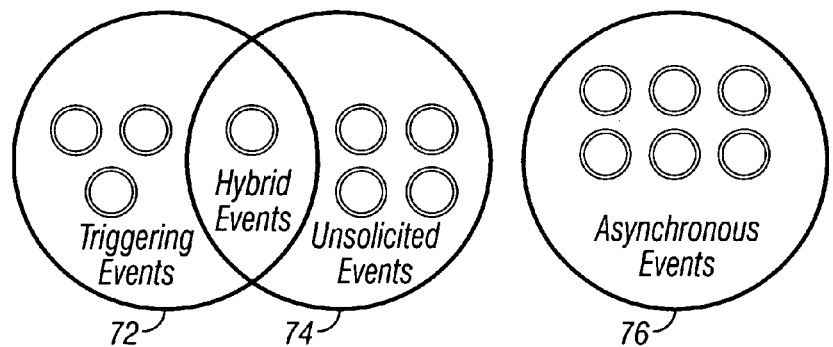
FIG. 7 depicts an abstract grouping of event types according to one embodiment of the present invention.

FIG. 7 depicts an abstract grouping of event types according to one embodiment of the present invention. In a preferred embodiment, the structure of the application server 12 relies upon a programming paradigm called the action-event model. In MCE 10, applications 20 respond to events and communicate through actions. The action-event model, instead of polling a resource over and over again for new data associated with an event such as an incoming call, automatically executes code associated with the event. In a preferred embodiment, an event is implemented as an inter-thread message created by a protocol provider 26 to indicate some sort of event occurred, which an application may be interested in. Such a message includes all relevant parameters and a Routing GUID (globally-unique identifier) which core engine 27 uses to correlate application sessions. A triggering event is one where the Routing GUID is new. Subsequent non-triggering events utilize the same Routing GUID as the original event. For example, "IncomingCall" would be a triggering event, whereas "Hangup" would be non-triggering. Events do not require a response.

MCE 10 monitors a variety of events which may arise. Such events include telephone calls, HTTP messages, and announcement status information, among others. When these occurrences manifest within MCE 10, an event is generated. Examples of events include CallControl.IncomingCall, and Providers.Http.GotRequest. Any number of events may fire simultaneously, and of course a single event may fire in rapid succession. Programs within the MCE typically respond to a small subset of the possible events which may be raised, but developers can select any combination of events based on business requirements.

Events originate from protocol providers 26 and reach applications 20 by way of the event distributor or router. Such a router is preferably part of core engine 27. A preferred embodiment of core engine 27 including a router or event distributor is further described with reference to FIG. 3.

In this embodiment, MCE 10 presents three distinct types of events to developers, with a fourth hybrid type for technical completeness. The three fundamental event types are triggering events, unsolicited events, and asynchronous events. Some events may be used as both triggering events and unsolicited events, even within the same application. These are called hybrid events. Typically, no asynchronous events occur as triggering or unsolicited events.

For each script 22 within applications 20, one particular triggering event 72 starts the script 22. MCE 10 preferably generates new script instances automatically each time a triggering event 72 occurs. Each script instance preferably operates independently of other scripts, so script state and script-level variables are automatically preserved. Preferably, MCE 10 will not execute an application 20 if it finds more than one application 20 with the same triggering event parameters.

Unsolicited events 74 can occur at any time during script 22 execution. Such events typically indicate an action which was taken by an external user. For example, a script which triggers on CallControl.IncomingCall must be prepared to receive the CallControl.Hangup unsolicited event at any time. Script designers may anticipate, however, multiple unsolicited events of the same type. For example, if a script 22 places several calls, multiple CallControl.Hangup unsolicited events may occur. If each event needs to be handled differently, script 22 may have branching code to properly interrogate each event signature and follow the necessary course of action. Such branching is one use of the userData parameter in actions which generate unsolicited events. MCE 10 automatically propagates information about parameters such as the userData information back to the event handler.

Asynchronous events 76 differ from unsolicited events in that they typically occur only after a corresponding action has executed. For example, calling the action MediaServer.PlayAnnouncement will attempt to play an audio stream to a specified destination. If the media cannot be played for any reason, within a fraction of a second the MediaServer.PlayAnnouncement_Failed event will respond back to the same script which made the request. However, if the announcement was played successful, the MediaServer.PlayAnnouncement_Complete event will occur. These two callbacks will not occur before the MediaServer.PlayAnnouncement action has executed, and one or the other is guaranteed to occur if the action executed successfully. This differs from unsolicited events which may not ever occur depending on the circumstances.

Figure 8:
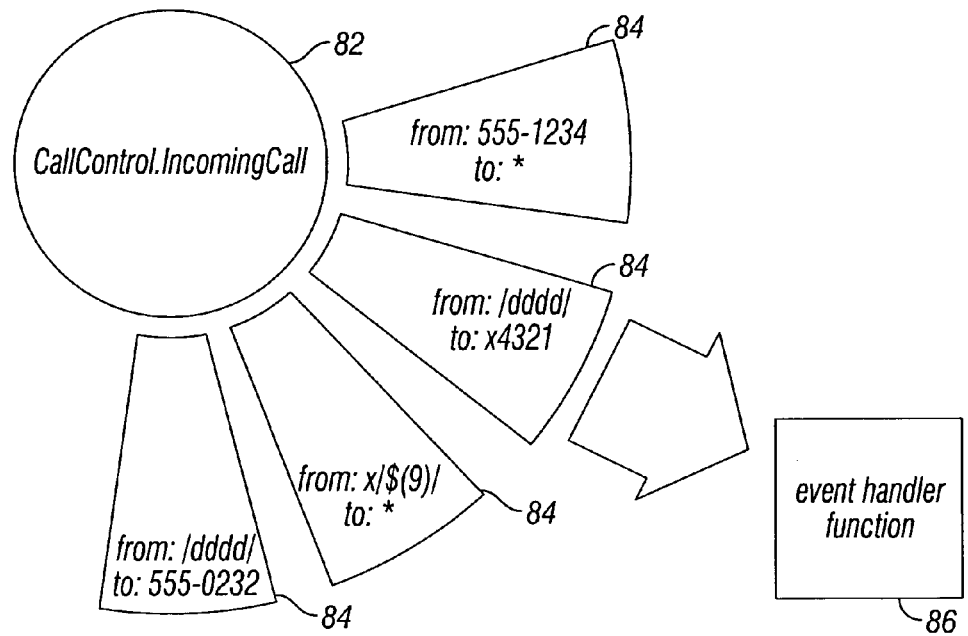
FIG. 8 depicts an event signature scheme according to a preferred embodiment of the present invention.

FIG. 8 depicts an event signature scheme according to a preferred embodiment of the present invention. The unique identification of particular event parameters used to initiate a function is called an event signature. In preferred embodiments, every time an event fires, functions associated with that event are invoked if and only if they corresponding event signature matches. These functions are called event handlers. The event handler scheme provides a programmatic way for event routing to occur within the architecture, rather than within applications. Such a scheme enables MCE 10 to handle the load-balancing, failover, and performance requirements of a deployment distributed across multiple server machines.

In the example depicted in FIG. 8, event 82 may have different combinations of associated parameters. Such parameters are compared with event signatures 84 to find the closest event signature. A match if forwarded to the event handler 86 associated with the closest event signature. An event handler may be defined for an exact range of parameters of interest. Such a range of parameters may be matched with a particular event signature. For example, if a script 22 should only begin when calls are placed to a particular set of phone numbers, the firing event can be interrogated to see if it matches the signature set of phone numbers needed by script 22. Expressions such as, for example, regular expressions may also be used to specify event signatures.

Events within MCE 10 may also be characterized according to a protocol session scheme. Such a scheme groups activities that are related by one common element, often the same user or user agent. For example, a visit to a website might constitute a session with a clear beginning and end, and data exchanged throughout. Similarly, the collection of TCP/IP packets transmitted to download a single image on one page of that visit might also be considered a session. Generally speaking, protocol providers within MCE 10 may present some concept of a session. The start of a new session is typically associated with a triggering event 72. Events which arise during the course of a session and are handled by applications 20 are either unsolicited events 74 or asynchronous events 76.

The complimentary component to events, actions, are used to send data outside of MCE 10 or carry out specialized application logic. An action is preferably an inter-thread message generated by the application runtime environment 24 on behalf of a script 22. The message contains the action name and all parameters specified in the script 22 in addition to an Action GUID. An Action GUID is preferably a concatenation of the Routing GUID which triggered this session and the Action ID. All actions preferably require responses. A provider, or some component in the core, must send a response of some sort (usually "success" or "failure") upon receiving an action. Like an action or event, responses are similar inter-thread messages. Application scripts 22 are typically constructed using conditional logic by linking together one or more actions. In a preferred embodiment, there are two main categories of actions: provider actions and native actions.

Figure 9:
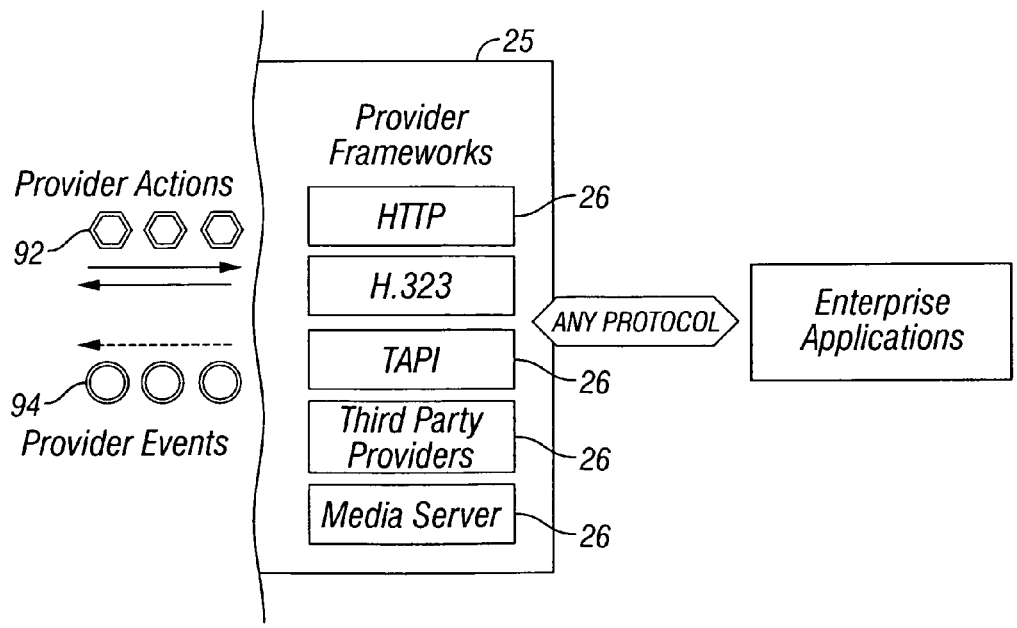
FIG. 9 depicts a flow chart of a provider action scheme according to one embodiment of the present invention.

FIG. 9 depicts a flow chart of a provider action scheme according to one embodiment of the present invention. Provider actions 92 flow out of an application 20 into provider framework 25. Provider events 94 bring messages from providers 26 back to applications 20. Information may flow in both directions when a provider action 92 is called by an application script. Information typically flows in only one direction, however, when a provider event 94 occurs.

Typically, calling a provider action 92 blocks script 22's execution until a response is returned. This sequence is indicated by the two execution arrows directly below the provider actions 92 in the diagram. Simple actions which only involve this execution path are called synchronous actions. However, some calls to a provider action may only be able to offer a provisional response. In such a case, the final response occurs later in the form of asynchronous event. This class of action is called an asynchronous action.

Figure 10:
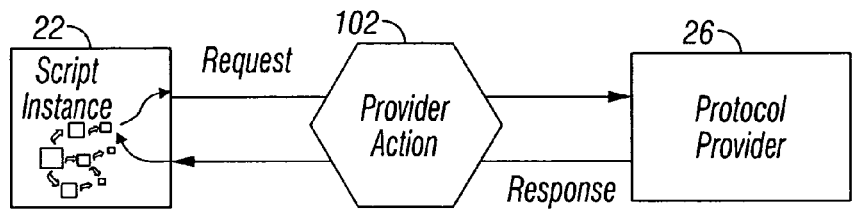
FIG. 10 depicts a flow chart for a synchronous provider action according to one embodiment of the present invention.

FIG. 10 depicts a flow chart for a synchronous provider action according to one embodiment of the present invention. Synchronous provider actions 102 represent a request-response transaction within the application server 12. First, action 102 is invoked from a particular location within an instance of script 22. Such invocation is called a request, which is passed to the associated protocol provider 26 for handling. When the provider is finished processing the message or an error occurs, an action response message is sent back to the specific script 22 instance that sent the original request, and script processing continues.

Preferably, from the time the original action request is sent until the time a response is received, the script instance 22 is in a wait state pending a response to the action 102. Such a scheme works well for the majority of actions because the time it takes to process the request is typically very short. Some types of actions may not have such a short processing time. For such actions, an asynchronous model is more appropriate.

Figure 11:
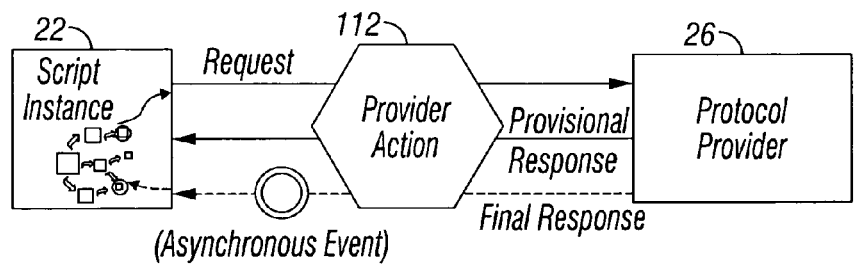
FIG. 11 depicts a flow chart for an asynchronous provider actions according to one embodiment of the present invention.

FIG. 11 depicts a flow chart for an asynchronous provider actions according to one embodiment of the present invention. Asynchronous provider actions allow for a provisional response to be sent by the protocol provider before the final response is sent to the script instance. For example, suppose an application script 22 places a call to some location. Preferably, application server 12 does not wait for the call to be answered since it could take an unknown amount of time. The request to place the call is passed to protocol provider 26, which returns a provisional response.

The provisional response indicates that the provider is processing the request but that it may take some indeterminate amount of time. Once the provisional response is received the script instance 22 continues executing normally. Using the example presented above, when a call is placed the provisional response indicates that the initial call request was successful and that the call is proceeding.

Protocol provider 26 then tries to fulfill the request. When the provider 26 is finished executing the asynchronous action request it constructs an asynchronous event, or callback event, and sends it to the script instance 22. The receipt of an asynchronous callback event indicates that the action transaction is complete. Asynchronous callbacks are a special type of unsolicited event in application server 12. They contain specific information that allows the virtual machine to map the event to the appropriate script instance and event handler. MCE 10 retains application state by ensuring that actions may call back their initiating script 22. Asynchronous callback events preferably eliminate the need for polling systems and help minimize resource utilization.

Figure 12:
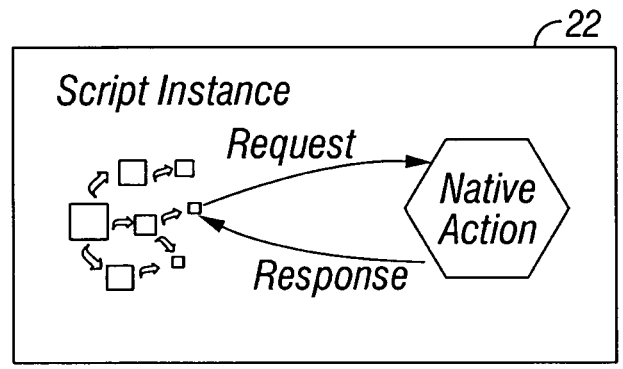
FIG. 12 depicts a flow chart for a native action according to one embodiment of the present invention.

FIG. 12 depicts a flow chart for a native action according to one embodiment of the present invention. Native actions provide application server 12 a method for extending functionality by allow developers to add custom logic that will execute within the script instance 22's virtual process space. Native actions provide a technique for executing operations that should reside within the application 20, but are better suited to traditional programming paradigms like the C++ language.

A native action is preferably always synchronous and is typically used for building application 20 logic that does not need to maintain state beyond the lifetime of the script instance and does not need to monitor any external network service. Unlike provider actions, native actions actually cause virtual machine 24 to execute the action logic within the context script instance.

Figure 13:
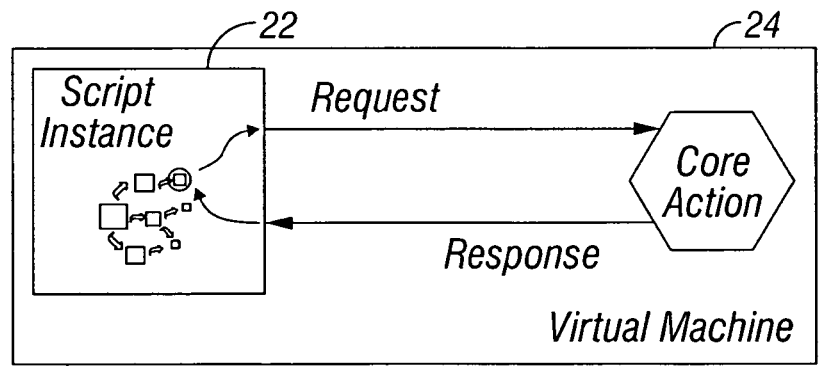
FIG. 13 depicts a flow chart for a core action according to one embodiment of the present invention.

FIG. 13 depicts a flow chart for a core action according to one embodiment of the present invention. Core actions are typically called by a script instance 22, but are handled internally by virtual machine 24. For example, application server 12 supports application control actions such as calling functions, exiting the current function, and ending the script. Preferably, all of such application control actions are core actions. Typically, a core action is a synchronous action.

Figure 14:
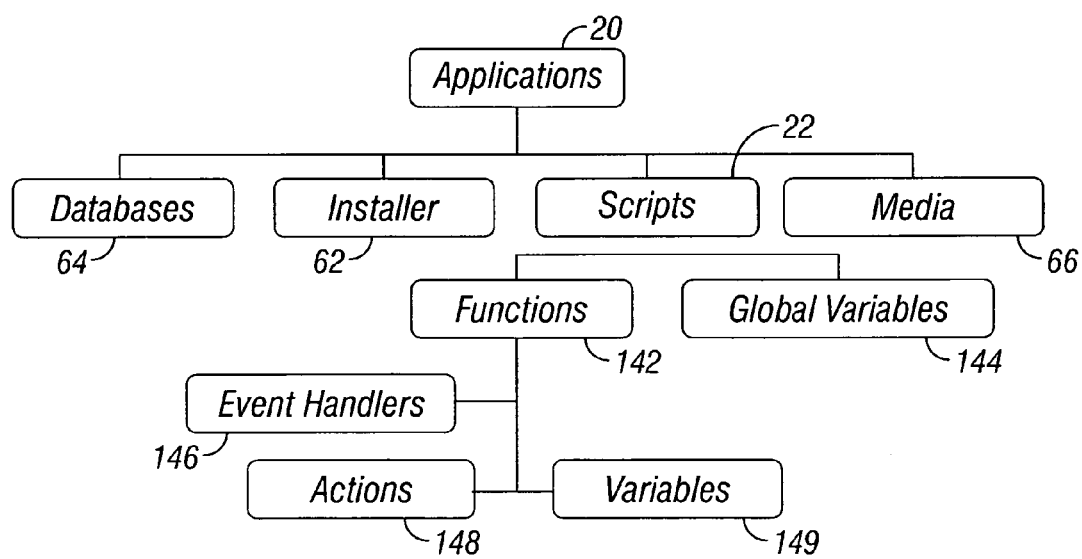
FIG. 14 depicts an organizational block diagram of functions and data according to one embodiment of the present invention.

FIG. 14 depicts an organizational block diagram of functions and data according to one embodiment of the present invention. FIG. 14 may be used to illustrate scoping, which refers to the accessibility of variables and code segments from within different functional blocks.

Preferably, all scripts 22 within an application are independent and invisible to one another. There is preferably no way to execute code, access variables, or interrogate the elements of one script 22 from another. In this embodiment, communication between scripts 22 must occur through a database, through an external messaging component such as protocol provider, or using a shared object called "SessionData" in a Master/Slave script configuration.

In this embodiment, the configuration settings defined by installer 62 are globally available from anywhere with application 20, but cannot be changed by the application 20 itself. Instead, using the system control panel 18, an administrator can modify configuration settings for an application 20.

Preferably, databases 64 may be accessed from within any script 22 within the database's associated application 20. Such access permits scripts 22 to communicate with one another, or to share data which will persist even after all script instances have ended.

Preferably, all media resources 66 may be accessed and played through any script 22 within application 20. Multiple scripts 22 may play the same media resource 66 at the same or overlapping times.

In preferred embodiments, communication between applications 20 must occur through an external service, such as a protocol provider or an external database, or using the "SessionData" object in a Master/Slave configuration.

In this embodiment, scripts 22 contain global variables 144 and functions 142. Global, or script-level variables 144 and functions 142 may be accessed by any function within the same script 22, but not by other scripts 22. Functions 142 comprise the lowest level scope in MCE 10, and thus preferably have access to all other levels above them. Functions 142 may also contain variables 149, which can be set or modified by function elements, but not by other functions 142, even those within the same script 22. Function-to-function communication should be performed by using script-level variables 144, or function parameters and return values.

Figure 15:
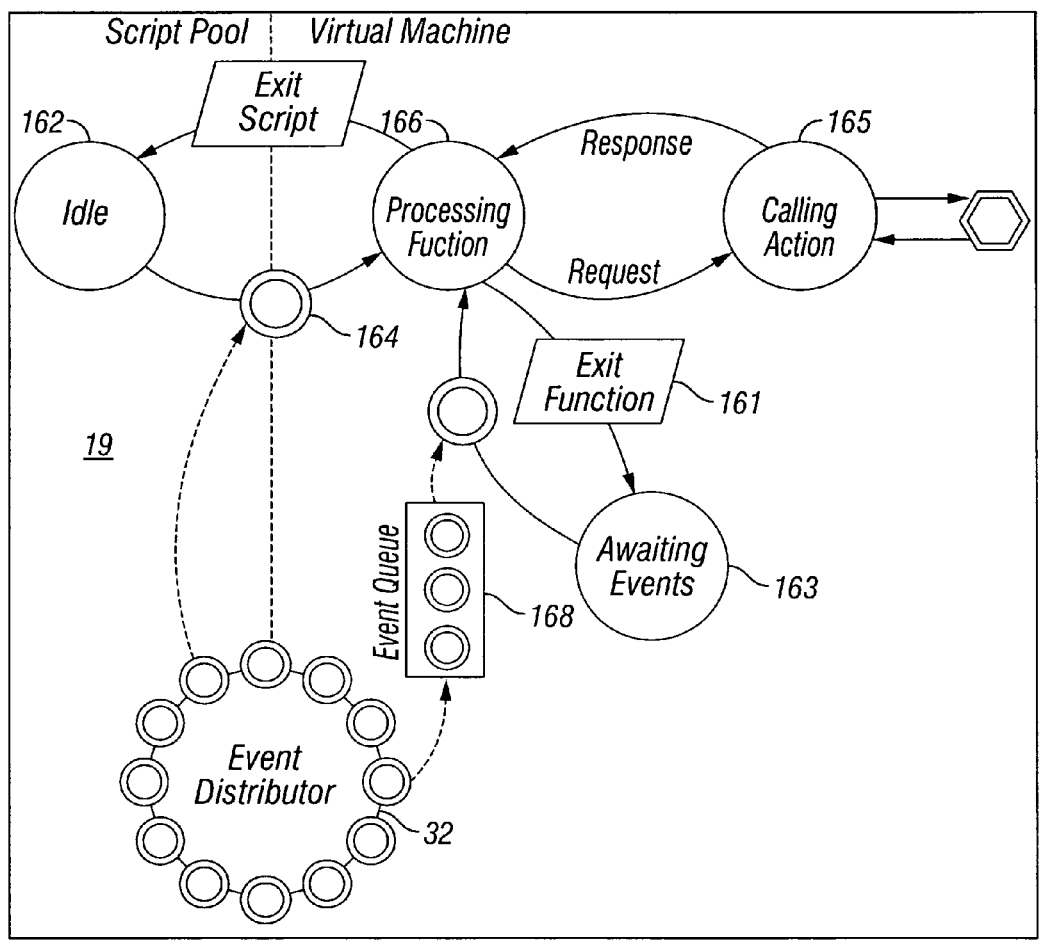
FIG. 15 depicts a state machine diagram of execution of a script instance according to one embodiment of the present invention.

FIG. 15 depicts a state machine diagram of execution of a script instance according to one embodiment of the present invention. When a script instance is in the idle state 162 it is waiting to be started and resides in script pool 19. Once a triggering event 164 that matches that script type is received, the triggered script 22 is executed by virtual machine 24. At this point, script 22 becomes a script instance and enters the processing function state. When inside state 166, events are queued in event queue 168 up until the script instance executes an EndFunction action 161, placing it in the awaiting events state 163. Preferably, script instances can handle at most a single event at any given time. Any event destined for the script that is received while processing of a previous event is in progress will be queued up and handled in the order in which it was received.

As described with reference to FIGS. 10-13, scripts 22 may call actions of various types. A request for such a call put a script instance in state 165 until the appropriate response is received from the action. Processing and queuing of received events is preferably handled by the core engine 27's router/event distributor 302.

Figure 16:
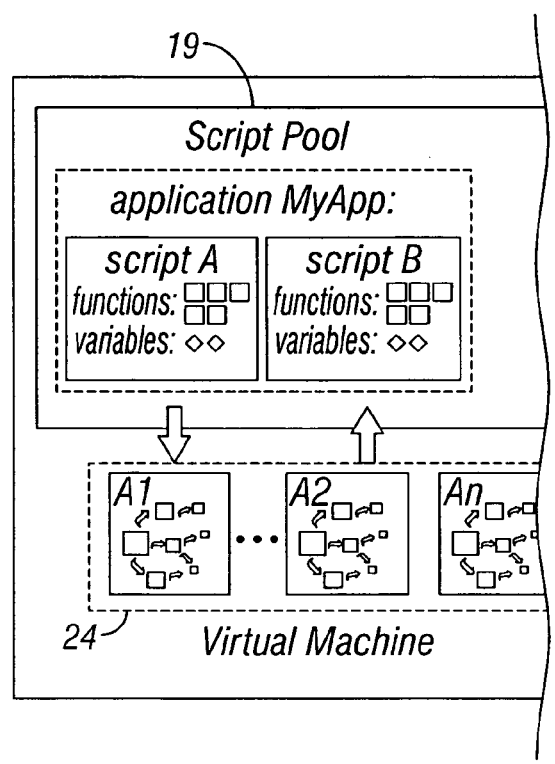
FIG. 16 depicts script instances according to a preferred embodiment of the present invention.

FIG. 16 depicts script instances according to a preferred embodiment of the present invention. The basic building block of an MCE 10 application 20 is an application script 22. Each script 22 represents a potential thread of execution for application 20. Scripts 22 begin when the application server 12 receives a triggering event. When this occurs, a new script instance of that script 22 is created and executed.

New script instances are executed within the application server 12's virtual machine 24, and each script instance preferably executes in a separate thread or virtual thread. In FIG. 15, an application called myApp contains two scripts, A and B. Each time a triggering event is received, MCE 10 places a new instance of script A into virtual machine 24. Whenever a script instance exits, it is removed from virtual machine 24. Script processing typically occurs inside functions. While a script may contain many functions, preferably only one of those functions serves as the event handler for the application script's triggering event.

As described referencing above Figures, a triggering event is an unsolicited event whose signature corresponds to a script 22 residing in the script pool 19. Triggering events are a combination of the type of event and specific event parameters required to start a new instance of an application script type. In a preferred embodiment, a triggering event must be unique across application server 12 and be matched with only one application script 22 for execution by virtual machine 24.

Preferably, an application executed by virtual machine 24 is a collections of scripts 22. A script 22 specifies a single triggering event and any number of functions. Functions are collections of actions and loops of actions. Functions, loops, and script structure are further described with reference to later Figures.

In a preferred embodiment, a particular script 22 only has one virtual thread of execution and thus only one function can be running at a time. A call stack is maintained when one function calls another. If a non-triggering event is received while a function is executing, it is placed into a queue until that function has completed and a suitable non-triggering event handler can then be located. An application 20 may contain any number of scripts and all those scripts may be executing in parallel handling different triggering events.

In one embodiment, scripts 22 may be master or slave scripts. Such a scheme allows data to be shared between separate script instances. Slave scripts are in every way the same as master scripts with one important exception, they are not registered with router 302 at install-time. Instead, when the master script starts executing, it must enable the slave script explicitly and may at that time modify the triggering parameters of the slave script. When a triggering event comes in for the slave script, the slave script is given a SessionData object. Such an object is preferably given to all scripts at runtime and contains the connections to any databases the application may have defined, the application name, the name of the application partition in which the current script is running, and a hash table that the script can do with as it pleases. A hash table is a contiguous section of memory with a number of addressable elements in which data can be quickly inserted, deleted and found. A slave script preferably gets a reference to the exact same SessionData instance as the master script which enabled it. In this way, the master and slave scripts may share data back and forth via the shared hash table in real time.

Some applications 20 need many threads to handle many sessions at once. For example, a particular application 20 may wish to place a large number of calls. One script 22 having only one thread of execution will typically not be able to handle a large number of calls in a timely fashion. Executing a slave script for each call represents one solution. In a preferred embodiment, however, slave scripts are only triggered by their own triggering events.

A special action called SendEvent allows applications 20 to generate such triggering events. Preferably, the SendEvent action is actually a direction to the virtual machine 24. The SendEvent action allows a script to send a triggering or non-triggering event as if it were a provider.

Using the SendEvent action, a script 22 may place a large number of calls. For example, script A sends 500 triggering events of type "NewCall." Script A was designed to interact with another script B, which is registered to handle "New-Call" events as a triggering event. In this example, 500 instances of script B will run to handle the triggering events generated by script A.

Further, a script may employ an action called the "Forward" action. The Forward action terminates the current script and forwards all subsequent messages to the designated script instance.

Referring to FIGS. 15 and 16, and also to FIG. 3, there are two significant subcomponents to be found associated with virtual machine 24 in a preferred embodiment. These components are script pool 19 and script scheduler 24A. When an virtual machine 24 is first constructed by the Application Manager 28 it places all scripts 22 in the application script pool 19 in memory map form. Script pool 19 then immediately makes copies of them and puts them in a separate area where they await execution. The original (master) copies remain in another area and are only used to make additional script copies when necessary.

When a triggering event arises for a script 22 in this application 20, the script pool 19 gives scheduler 24A the waiting copy and immediately begins making a new copy from the master. Scheduler 24A then seeds the script 22 with the data from the triggering event, initializes any global variable values from config, initializes any function variables from the event parameters, and executes the first action.

Scheduler 24A preferably schedules script instances in the same way a multi-tasking operating system schedules processes. Instead of using timeslices, scheduler 24A treats each action as an atomic operation. Native actions executed to completion in one cycle of scheduler 24A. Provider actions simply create an inter-thread message and send it down into the core for handling. Scheduler 24A preferably does not wait for provider responses. When the provider response is received it is placed on in coming response queue and handled when that script 22's turn comes back around. Provider actions which take a long time are broken into three parts instead of the usual two: Action, response, and asynchronous callback (FIG. 11). Metreos.CallControl.MakeCall is an example of one such action. It sends a response (provisional) to indicate that it is trying the number so the script can go on executing in the interim. When the remote party answers the phone, an asynchronous callback is sent to application 20 to indicate the answer along with all the pertinent data. Application 20 handles this in the same way it does a non-triggering event.

In a preferred embodiment, there is only one scheduler 24A, part of the virtual machine 24, for each application 20. Scheduler 24A schedules all instances of all scripts 22 currently running for that application 20. Alternatively, if the were no scheduler, each script would have its own execution engine and run in its own thread. Such an embodiment is not, however, preferred. In situations such as the example above describing 500 calls, such an embodiment would be unwieldy and may violate operating system limitations if each instance actually had its own thread.

Preferably, each scheduler 24A uses a thread pool to avoid being bogged-down under heavy load. Each scheduler 24A creates a pool of five threads which is dynamically expandable to a configurable limit. The threads are used to execute actions. Thus the number of threads in the pool represents the number of actions which may the executing simultaneously. In such a scheme, scripts 22 preferably have no direct relationship to threads. A script 22 may be assigned a different thread each time an action in the script 22 is executed. Under heavy load, the thread pool will automatically begin spawning new dynamic threads. These threads are preferably set to decay (or self-destruct) after a configurable period of dormancy. Thus if the system is idle for a while, all the thread pools will contract back to the initial five threads.

A script 22 can handle as many non-triggering events as many times as it wants. It is up to the functions themselves to determine when it is time for the script to end.

Figure 17:
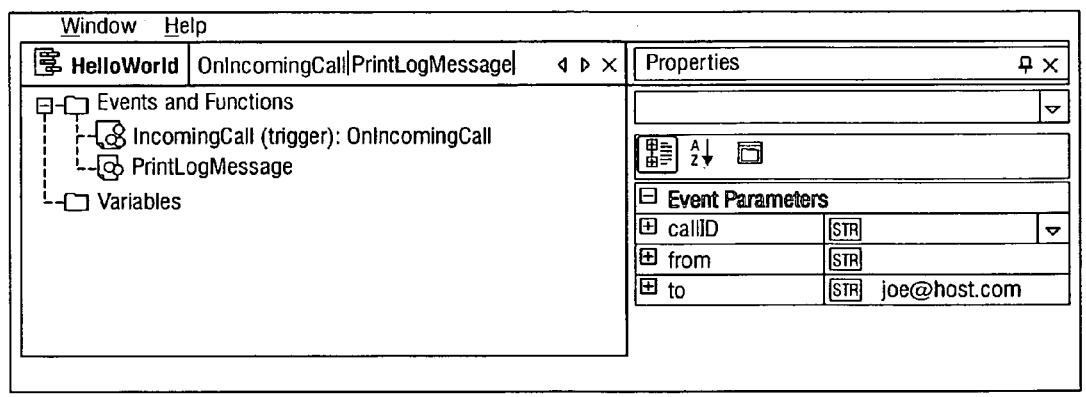
FIG. 17 depicts a screenshot from a visual designer according to a preferred embodiment of the present invention.

FIG. 17 depicts a screenshot from a visual designer 16 according to a preferred embodiment of the present invention. The triggering event used to start the "Hello World" application from the example above is illustrated in this screenshot. Intermediate code produced by visual designer 16 to instantiate the depicted event is listed in Table 6. As shown in line 2 of Table 6, a new script instance will begin when an event of type Metreos.CallControl.IncomingCall is received and contains a parameter named "to" with a value of "joe@host.com". If the event has a different value for the "to" parameter, then a new script instance would not start.

TABLE 6

```
1   <trigger>
2       <triggerEvent>Metreos.CallControl.IncomingCall</triggerEvent>
3       <triggerParam name="to">joe@host.com</triggerParam>
4       <triggerHandler>PrintLogMessage</triggerHandler>
5   </trigger>
```

In this embodiment, multiple script types may trigger on the same event type and even the same event parameters. Preferably, the matching criteria such event parameters must be unique. Such unique parameters are known as the triggering event signature. The triggering event signature must contain at least an event type. Further, triggering event declarations in the intermediate code must always include the name of the function that should be called to handle the triggering event.

Figure 18:
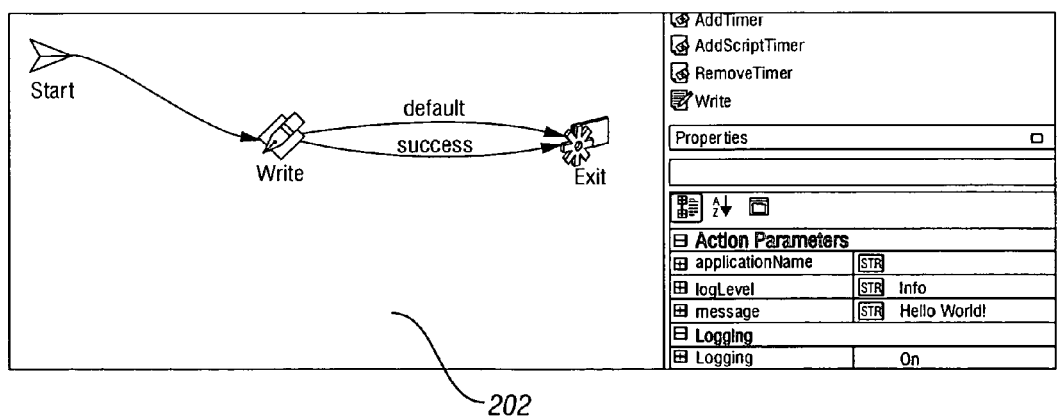
FIG. 18 is a partial view of one screen of visual designer according to one embodiment of the present invention.

FIG. 18 is a partial view of one screen of visual designer 16 according to one embodiment of the present invention. Visual designer 16 offers a drag-and-drop application canvas, and compiles nodes and connecting arrows into XML formatted according to Metreos specifications. The core language of MCE applications derives from eXtensible Markup Language (XML). The visual designer 16 application canvas 202 displays a conceptual and logical diagram of data flow through a telephony application or other application developed for MCE 10.

Further, most of the elements apparent on the application canvas 202 of visual designer 16 correspond in a one-to-one relationship with XML elements. Visual designer 16 converts a particular visual design for an application 20, consisting of actions, events and routing options, to the compiled XML version of the same application 20. An XML version of the "Hello World" program depicted in FIG. 18 is listed in Table 7.

In this embodiment, visual designer 16 stores information that contains all of the necessary data to not only generate the application XML, but also to render the application properly on the screen for development. When the visual designer 16 compiles application 20 from the local source code it generates XML formatted according to a Metreos Application Script XML schema. Other schemas may be defined and used. This XML document can be thought of as the intermediate code used by application server 12 for execution.

TABLE 7

```
1   <?xml version="1.0" encoding="utf-8" ?>
2   <serviceApp name="Hello World"
3       xmlns="http://metreos.com/ServiceApp.xsd"
4       xmlns:xsi="http://www.w3.org/2001/XMLSchema-instance">
5       <variable
        type="Metreos.Types.String">myGlobalVariable</variable>
6
7       <trigger>
8           <triggerEvent>Metreos.CallControl.IncomingCall</triggerEvent>
9           <triggerParam
            name="to">joe@host.com</triggerParam>
10          <triggerHandler>PrintLogMessage</triggerHandler>
11      </trigger>
12
13      <function id="PrintLogMessage">
14          <variable type="string">myLocalVariable</variable>
15
16          <action id="1" type="native">
17              <actionName>Metreos.Native.Log.Write</actionName>
18              <actionParam
                name="message">Hello World!</actionParam>
19              <actionParam name="logLevel">Info</actionParam>
20              <nextAction returnValue="success">2</nextAction>
21              <nextAction returnValue="default">2</nextAction>
22          </action>
23
24          <action id="2">
25              <actionName>Metreos.ApplicationControl.Exit</actionName>
26          </action>
27      </function>
28  </serviceApp>
```

Such an XML application storage naturally retains the wide array of benefits provided by XML. Applications may be easily stored on any modern platform, transported across virtually any network infrastructure, and parsed due to a well-defined schema. XML technology may require, however, significant overhead, which may waste resources or increase the potential for error. Preferably, MCE 10 addresses such issues through the use of an application assembler 28 (FIG. 2), which converts bulky XML into streamlined object code, while checking for correctness and rejecting malformed applications 20.

Like many programming languages, MCE 10 allows developers to group application logic into functions. In a preferred embodiment, visual designer 16 allows application developers to utilize two types of functions: event handling and standalone. Table 8 shows a listing of how a standard, standalone function declaration is represented in the intermediate XML code generated by visual designer 16.

TABLE 8

| | |
|---|---|
| 1 | <function id="StandaloneFunction"> |
| 2 | <!-- Function Body Removed --> |
| 3 | </function> |

Event handling functions are only executed in response to an event that is received by the script instance. Table 9 shows a listing of the declaration of a function that will handle the Metreos.Providers.Http.GotRequest event.

The presence of the <eventHandler> tag (line 2) indicates to virtual machine 24 that the function should start when an HTTP GotRequest event is received by the script instance. It is important to note that other GotRequest events may be received by the application server 12 and unless they are specifically destined for the script instance they will be treated as potential triggering events. In other words, event handling functions are specifically for handling unsolicited events for currently executing script instances.

TABLE 9

```
1 <function id="HandleHttpRequest">
2   <eventHandler>Metreos.Providers.Http.GotRequest</eventHandler>
3   <!-- Function Body Removed -->
4 </function>
```

In a preferred embodiment, a function also contains a signature that must be present in the input parameters passed to the function when it is started. Function parameters behave the same when used in both standalone and event handling functions. To indicate that a function takes an input parameter, a <variable> element must be added and that element must include an initWith parameter as shown in the code listing of Table 10.

TABLE 10

| | |
|---|---|
| 1 | <function id="FunctionWithInputParameters"> |
| 2 | <variable type="Metreos.Types.String" |
| 3 | initWith="someParameter">variableName</variable> |
| 4 | <!-- Function Body Removed --> |
| 5 | </function> |

Preferably, a function may have as many input parameters as the application developer chooses to add. If the function is marked as an event handler and also includes input parameters, then the <eventParam> elements must be included to indicate the matching criteria for the event handler as shown in Table 11. The function and optionally, its parameters and type of event that it may handle, constitute the function signature.

TABLE 11

```
1 <function id="HttpEventHandlerA">
2   <eventHandler>Metreos.Providers.Http.GotRequest</eventHandler>
3   <eventParam name="url">/some/url</eventParam>
4   <variable type="Metreos.Types.String"
5     initWith="url">requestUrl</variable>
6   <!-- Function Body Removed -->
7 </function>
8
9 <function id="HttpEventHandlerB">
10   <eventHandler>Metreos.Providers.Http.GotRequest</eventHandler>
11   <eventParam name="url">/another/url</eventParam>
12   <variable type="Metreos.Types.String"
13     initWith="url">requestUrl</variable>
14   <!-- Function Body Removed -->
15 </function>
```

In a preferred embodiment, function signatures, much like the triggering event signature, must be unique. The primary difference between the two is their scoping. Triggering event signatures must be unique across the entire system. In other words each application script type must have a different triggering event signature. In contrast, function signatures must be unique within the application script itself.

For example, given the event handling functions shown in Table 11 it is apparent that both functions handle the HTTP GotRequest event. Furthermore, both functions declare an event parameter that must match against the urn field in the incoming event. The first function, HttpEventHandlerA will be executed when a GotRequest event is received that was destined for "/some/url". If the request was sent to "/another/url" then the second event handling function, HttpEventHandlerB, will be executed. If neither function matches then the event will not be handled and will, in this example, be ignored. Application server 12 will pick the best matching event handler for the specified parameters.

Figure 19:
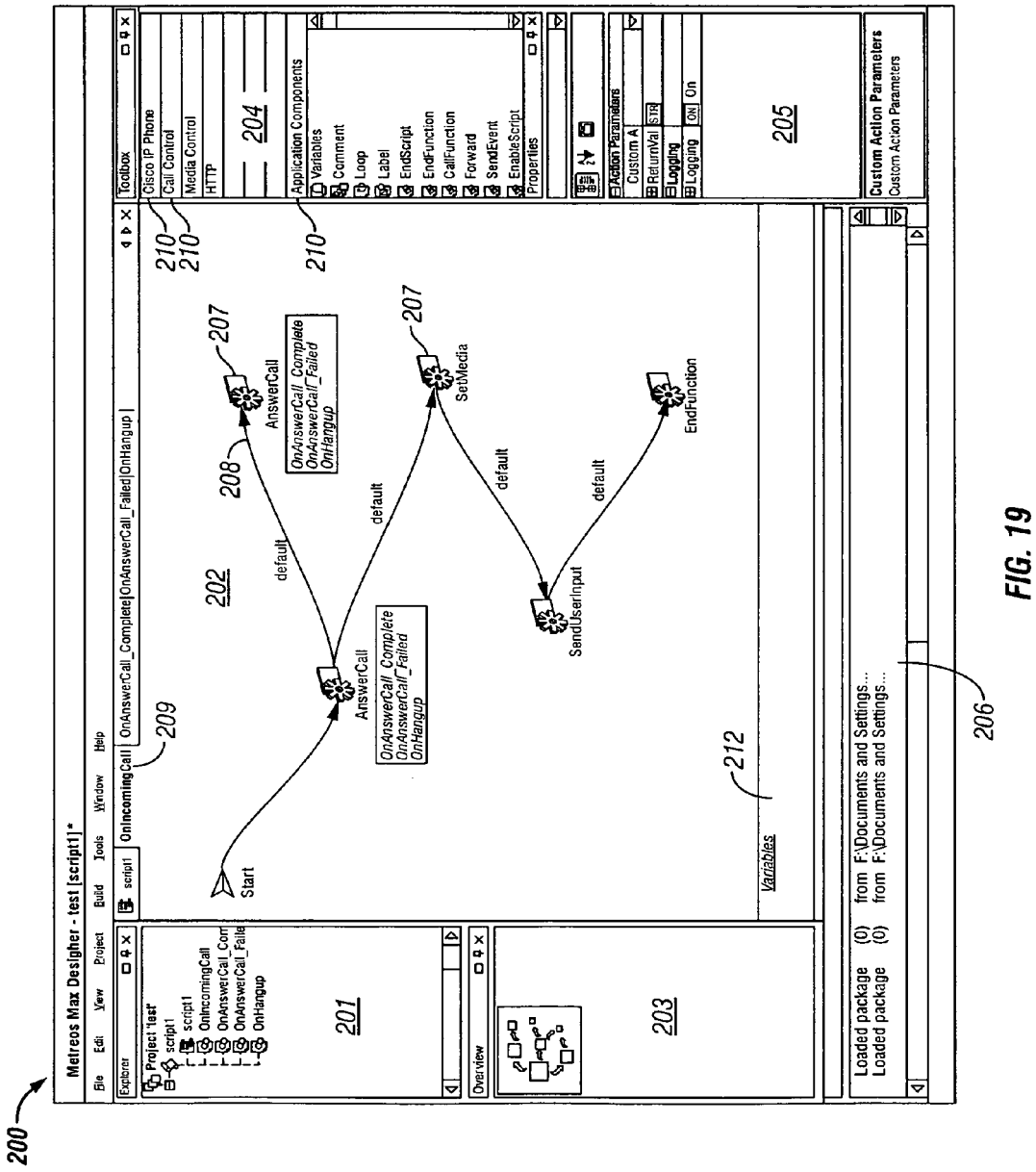
FIG. 19 depicts a graphical user interface screenshot for a visual designer according to one embodiment of the present invention.

In a preferred embodiment, a function is displayed in visual designer 16 as a web of interconnected action icons such as, for example, those depicted in FIG. 19. Each of the connections is labeled. Those labels indicate the path that execution will follow depending on the result of the prior action. All actions must return a result. That result is preferably a free-form string. If there is no path defined for a particular value of result, the "default" path is taken. Within the context of a loop, an action may point to the edge of the loop bounding box indicating that execution should return to the first action in the loop (i.e. "continue") or the next action after the loop if the loop count has been reached. Alternately, an action within a loop may point to an action outside the loop to indicate that execution should leave the loop unconditionally (i.e. "break").

One or more actions may reside inside a loop. A loop may be designated in visual designer 16 as a dashed rectangle around the set of actions. In the generated XML, loops have their own section within a function declaration. A loop has only one property, the loopCount. There are three different types of loop counts.

A loop count of Literal (int) type is eventuated in a standard for-loop. The index is an integer, referenced as "loopIndex", which starts at zero and increment until loop count minus one.

In this embodiment, the other two loop counts are types Enumerable (IEnumerator) and Dictionary (IDictionaryEnumerator). Another preferred embodiment uses the Java equivalent. These loop count types can only be derived from variable or C# or Java loop count declarations. It is preferably not possible to specify an Enumerable or Dictionary loop count with a literal value. Preferably, the loop count for loop type Enumerabe must resolve to an object which implements System.Collections.Ienumerable, or the Java equivalent. This type of object is preferably a one-dimensional collection over which loop may iterate. The loop index, referenced as "loopEnum", is initialized with the enumerator for the collection and positioned at the first item. The current item in the collection is referenced as "loopEnum.Current". The loop continues until the enumerator reaches the end of the collection.

The Dictionary type loop count works the same as enumerable except that it works with name-value collections, like Hashtable. The Dictinary loop count is referenced as "loopDictEnum" and the current values are referenced as "loopDictEnum.Key" and "loopDictEnum.Value".

Using such a loop count scheme, it is possible to loop for a constant amount of time or iterate over any collection of unknown size. The names mentioned above for referencing the current index can be used inside of any C# or Java code segment (i.e. Native action, UserCode action, or C# action parameter).

Only one function is designated to start when a script 22 begins. From there, it may call other functions. When the main function is complete, the script may exit or it may wait for non-triggering events. Any number of functions can be defined to handle any number of non-triggering events.

For example, application 20 called MyApp contains one script 22, "HandleIncomingCall". That script 22 has a function "OnIncomingCall" which is set to execute when the triggering event Metreos.CallControl.IncomingCall is received. The function executes and then exits without terminating the script. The script 22 has another function called "OnHangup" which is set to begin executing when the non-triggering event Metreos.CallControl.Hangup is received. When that non-triggering event comes in, the OnHangup function executes then elects to terminate the script 22. At that point, the virtual machine 24 removes the script from the scheduler's execution queue.

Variables allow application developers to store and manipulate data within their application scripts. Variables may either be initialized with a default value or initialized using incoming event parameters. Furthermore, variables may be globally or locally scoped. A global variable is visible and useable in all functions, whereas a local variable is visible and usable only within the function where it is defined.

TABLE 12

```
1  <?xml version="1.0" encoding="utf-8" ?>
2  <serviceApp name="Conference Application"
3    xmlns="http://metreos.com/ServiceApp.xsd"
4    xmlns:xsi="http://www.w3.org/2001/XMLSchema-instance">
5    <variable
     type="Metreos.Types.String">myGlobalVariable</variable>
6
7    <!-- Trigger Removed -->
8
9    <function id="PrintLogMessage">
10     <variable type="string">myLocalVariable</variable>
11     <!-- Function Body Removed -->
12   </function>
13 </serviceApp>
```

The code listing in Table 12 shows how global and local variables are represented in a preferred embodiment MCE 10's application script XML intermediate language. A global variable declaration appears in line 5. Notice that line 5 is within the script listing but is not within the function declaration beginning at line 9. The function declaration at line 10 is a local variable within the function declared at line 9.

Global and local variables act differently when they contain initWith attributes. When global variables are initialized using initWith, application server 12 attempts to retrieve configuration values from the configuration database to store in the global variable. For an example, see the global variable declaration shown in the code listing of Table 13.

When a new script instance of a script type containing the code in the preferred scheme of Table 13 starts execution, the application server 12 will attempt to initialize myGlobalVariable with the value of the SomeConfigEntry configuration parameter (line 3). If it is unable to do so, the script instance will not start. If Table 13 had instead declared a local variable within a function, the application server 12 would attempt to initialize it with a value from the incoming event message. The message would be searched for a parameter named SomeConfigEntry, and if found, its value would be placed into myGlobalVariable.

TABLE 13

```
1  <serviceApp>
2    <variable type="Metreos.Types.String"
3      initWith="SomeConfigEntry">myGlobalVariable</variable>
4  </serviceApp>
```

Preferably, a large part of most application scripts is the conditional logic constructed by linking together actions. Actions were previously discussed in context of the application server 12's execution model. Table 14 shows how a simple action map would be represented in the application script's intermediate XML code. In a preferred embodiment, each action is comprised of two mandatory elements: actionName and nextAction. Each action may also define zero or more act ionParam elements.

In this embodiment, the flow of the application script is defined by how the actions link to one another, as represented by the nextAction elements (lines 6 and 7, line 14). Each nextAction element contains a returnValue attribute which indicates which path to take, based on the result of the action.

TABLE 14

```
1  <function id="PrintLogMessage">
2    <action id="1" type="native">
3      <actionName>Metreos.Native.Log.Write</actionName>
4      <actionParam name="message">Hello World!</actionParam>
5      <actionParam name="logLevel">Info</actionParam>
6      <nextAction returnValue="success">2</nextAction>
7      <nextAction returnValue="default">3</nextAction>
8    </action>
9
10   <action id="2" type="native">
11     <actionName> Metreos.Native.Log.Write </actionName>
12     <actionParam name="message">Hello World,
        Again!</actionParam>
13     <actionParam name="logLevel">Error</actionParam>
14     <nextAction returnValue="default">3</nextAction>
15   </action>
16
17   <action id="3">
18     <actionName>Metreos.ApplicationControl.Exit</actionName>
19   </action>
20 </function>
```

FIG. 19 depicts a graphical user interface screenshot for a visual designer 16 according to one embodiment of the present invention. The various portions of graphical user interface 200 will be further described with reference to FIG. 20 together with FIG. 19.

Figure 20:
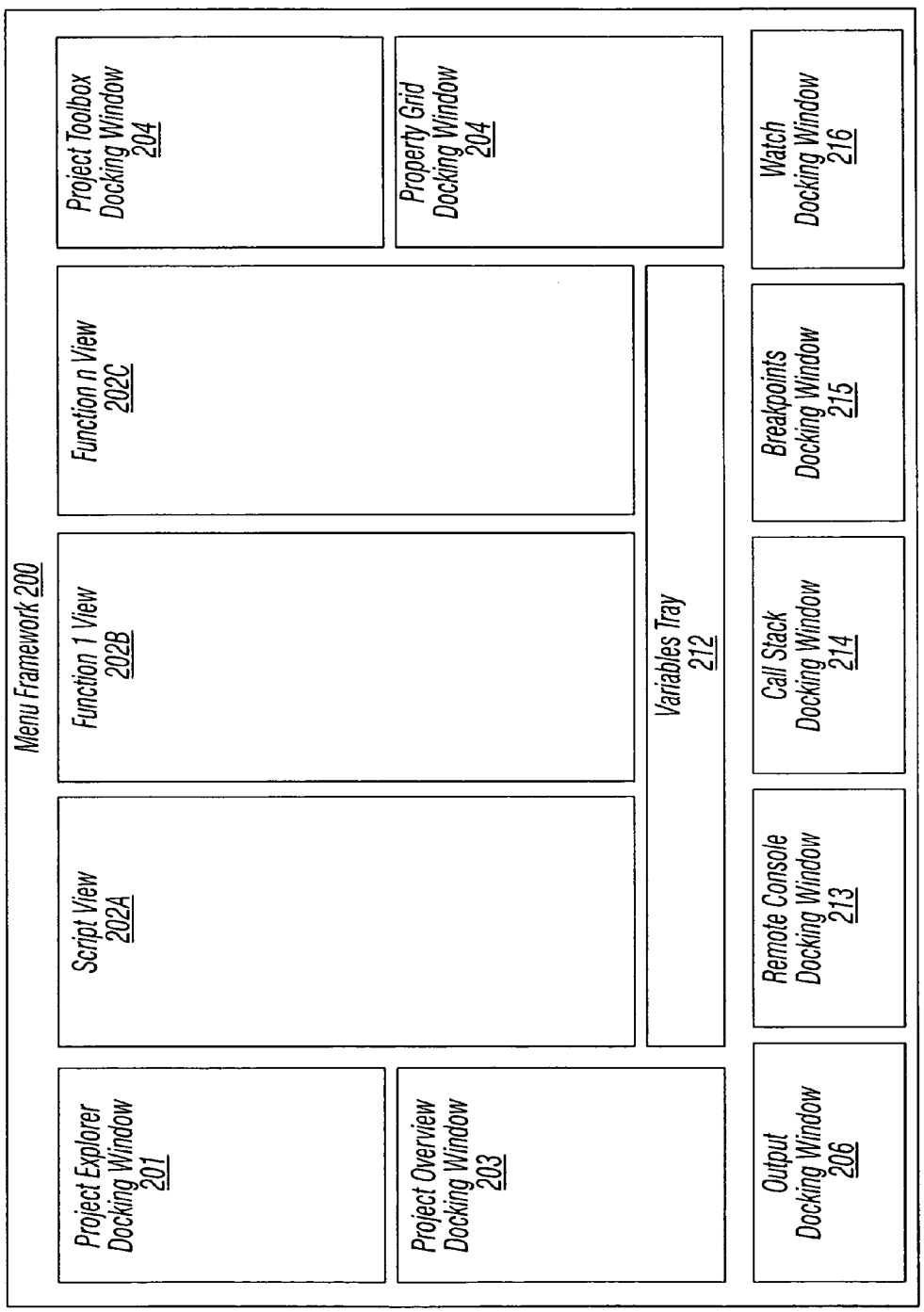
FIG. 20 depicts a block diagram of components of the graphical user interface depicted in FIG. 19.

FIG. 20 depicts a block diagram of components of the graphical user interface depicted in FIG. 19. In this preferred embodiment, graphical interface 200 of visual designer 16 has application canvas 202. Elements of the telephony application 20 appear as nodes 207 in a web-like diagram depicted on application canvas 202. Routing arrows 208 indicating the flow of program execution based on defined conditions. Nodes 207 represent either actions called by application 20 to achieve a desired affect, or programmatic control structures. Nodes 207 are dragged from toolbar 204 ("toolbar", "toolbox", "project toolbox") onto application canvas 202.

The user may create diagrams on application canvas 202 using application elements from toolbox 204 such as, for example, actions, control structures, and variables. Such elements are linked to form the design of an application 20. A particular diagram for an application 20 may become much larger than the user's screen. Application canvas 202 may be panned up and down or left and right using scrollbars to accommodate such large views.

Tabs 209 are provided to further accommodate viewing a large application, and to separate application diagrams logically or structurally. Tabs 209 in FIG. 19 operate to change the view on application canvas 202. Some exemplar views are depicted as separate blocks 202A, 202B, and 202C in FIG. 20.

In a preferred embodiment, script view 202A shows the entire diagram of a script. Function 1 view 202B shows a diagram of a particular function which may be entered by the user or pulled from a library, another program, or other sources. View 202a is preferably a view of the first (triggering event) function in application 20. Function n view 202C depicts the possibility of further function views, which are preferably accessible in sequential order according to their appearance in the application. Other views are possible. Examples of such other views are data views and screen views. Other viewing schemes are further described with reference to later Figures.

Project explorer 201 presents a tree view of application 20 components which may be navigated through interaction with explorer 201. Preferably, project explorer 201 lists all chief components of the currently loaded application 20, grouped by category. Components may include scripts 22, installers 62, databases 64, and media resources 66. Project explorer 201 acts as the main navigation system for visual designer 16, permitting developers to switch between each piece of a large application 20.

In this embodiment, application components or elements reside in toolbox 204. A user adds an element to an application by clicking on the appropriate category heading 210 listed in toolbox 204 and then dragging and dropping the desired element onto application canvas 202. In a preferred embodiment, third-party components may be added to toolbox 204 by developing new protocol providers 26.

Overview window 203 in this embodiment displays a small representation of the current application canvas 202. A rectangle 211 overlaid on overview window 203 indicates the area of the canvas 202 currently visible onscreen. Users may click and drag a new rectangle 211 to change the viewing area of application canvas 202. Users may also drag rectangle 211 or move it with arrow keys to navigate canvas 202.

Variables tray 212 displays variables that are local to the current function or script displayed on canvas 202. Users may change various property settings associated with an element using properties window 205. A user may focus property window 205 onto a particular element by clicking on a specific instance of the element on application canvas 202, or by clicking on the original element item in toolbox 204. Different elements types of elements will present different properties for modification. Such properties may be, for example, initialization values or return values. Property window 205 permits modification of properties for actions, events, variables, scripts, and projects.

When a user compiles an application 20 for eventual installation to application server 12, the compiler may generate information, warning, or error messages. Such messages preferably appear in output window 206. Preferably, a user can click on a message to navigate to an associated element.

Remote console window 213 may be activated to show the console view (interface screen) remotely for a particular MCE 10 system to which visual designer 26 may be connected. Such a view may be useful for debugging, operations, and maintenance.

Still referring to a preferred embodiment of visual designer 16, call stack docking window 214 provides a user with detailed information on protocol stack or call stack of calls within application 20. Such information may be useful for debugging. Breakpoints docking window 215 allows a user to manage breakpoints within an application 20 for debugging purposes. Watch docking window 216 shows debugging values of variables or elements on which a user has set a watch. Debugging within visual designer 16 is further described with reference to later Figures.

Figure 21:
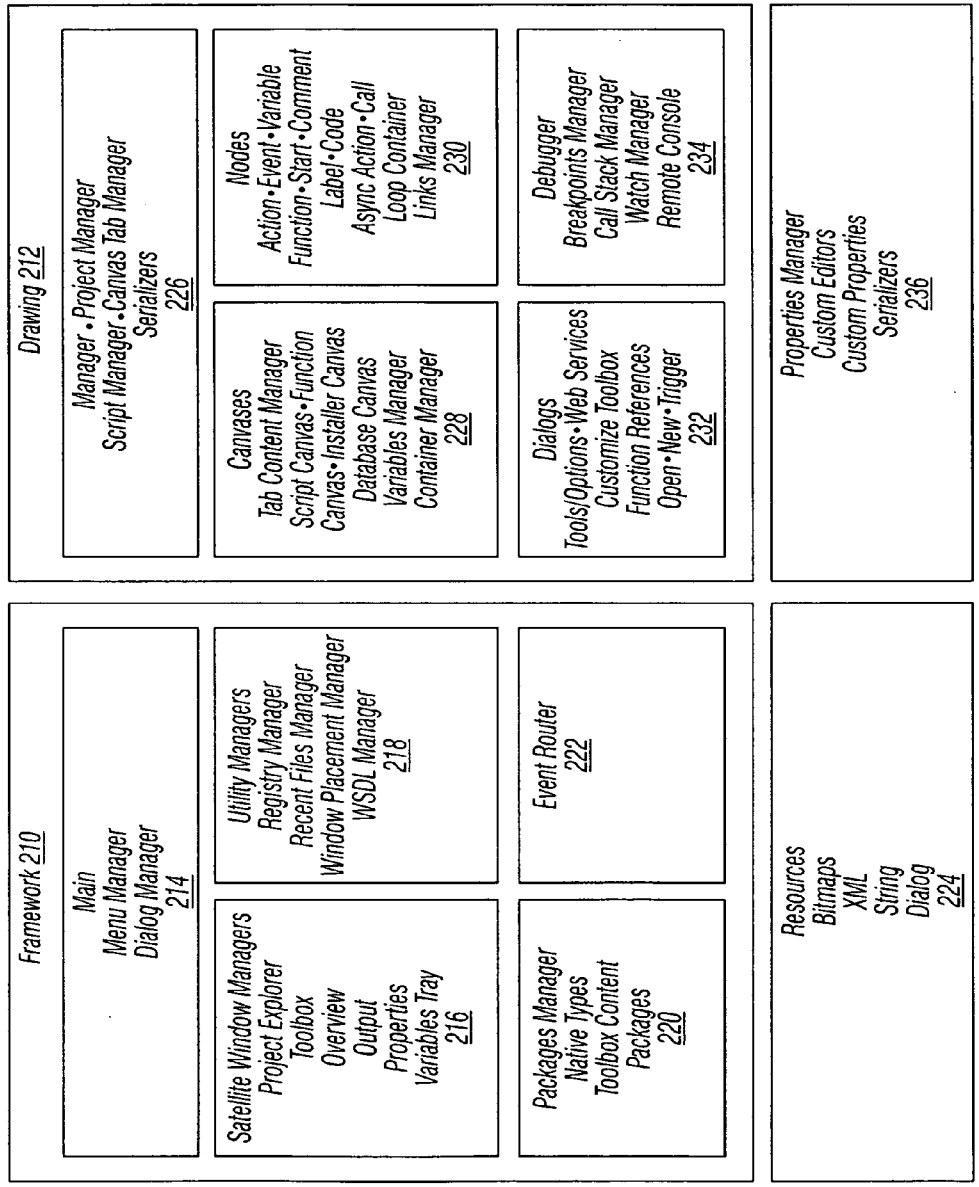
FIG. 21 depicts a structural block diagram of a visual designer according to a preferred embodiment of the present invention.

FIG. 21 depicts a structural block diagram of a visual designer 16 according to a preferred embodiment of the present invention. In this embodiment, visual designer 16 comprises an application framework 210 and a drawing framework 212.

Application framework 210 comprises a main module 214 including a menu manager and dialog manager for visual designer 16. Application framework 210 also has a number of satellite window managers 216 for managing the various windows above with reference to FIG. 19.

Utility managers 218 manage various housekeeping aspects of visual designer 16, including a Web Services Description Language (WSDL) Manager. Packages manager 220 manages the various packages that may be installed with visual designer 16, including third party toolboxes and packages. Event router 222 generates routes for various events associated with script 22 functions. Further, applications framework 210 includes various resources 224 employed by visual designer 16.

Drawing framework 212 includes managers 226. Managers 226 include a project manager for encapsulating projects within visual designer 16, a script manager, and a canvas tab manager. Further included are various serializers such as, for example, an XML serializer and a database serializer. Such serializers are known in the art, and are operational to convert the drawing layouts and other objects in visual designer 16 to code.

Drawing framework 212 further includes canvases modules 228 for implementing the various visual interfaces to visual designer 16. Also included in drawing framework 212 are various node modules 230 to implement nodes which make up the various applications.

Dialogs module 232 manages various dialogs which may be presented to the user. Debugger module 234 includes various submodules for implementing interfaces to MCE 10 and to visual designer 16 users and modules to provide debugging functionality. Debugging will be further described with reference to FIG. 25.

Further, visual designer 16 includes various other modules 236 such as custom editors which may be launched by visual designer 16 to allow editing of third party components or custom views. A custom properties module allows developers to add and manage custom properties to the various objects included in an application.

Figure 22:
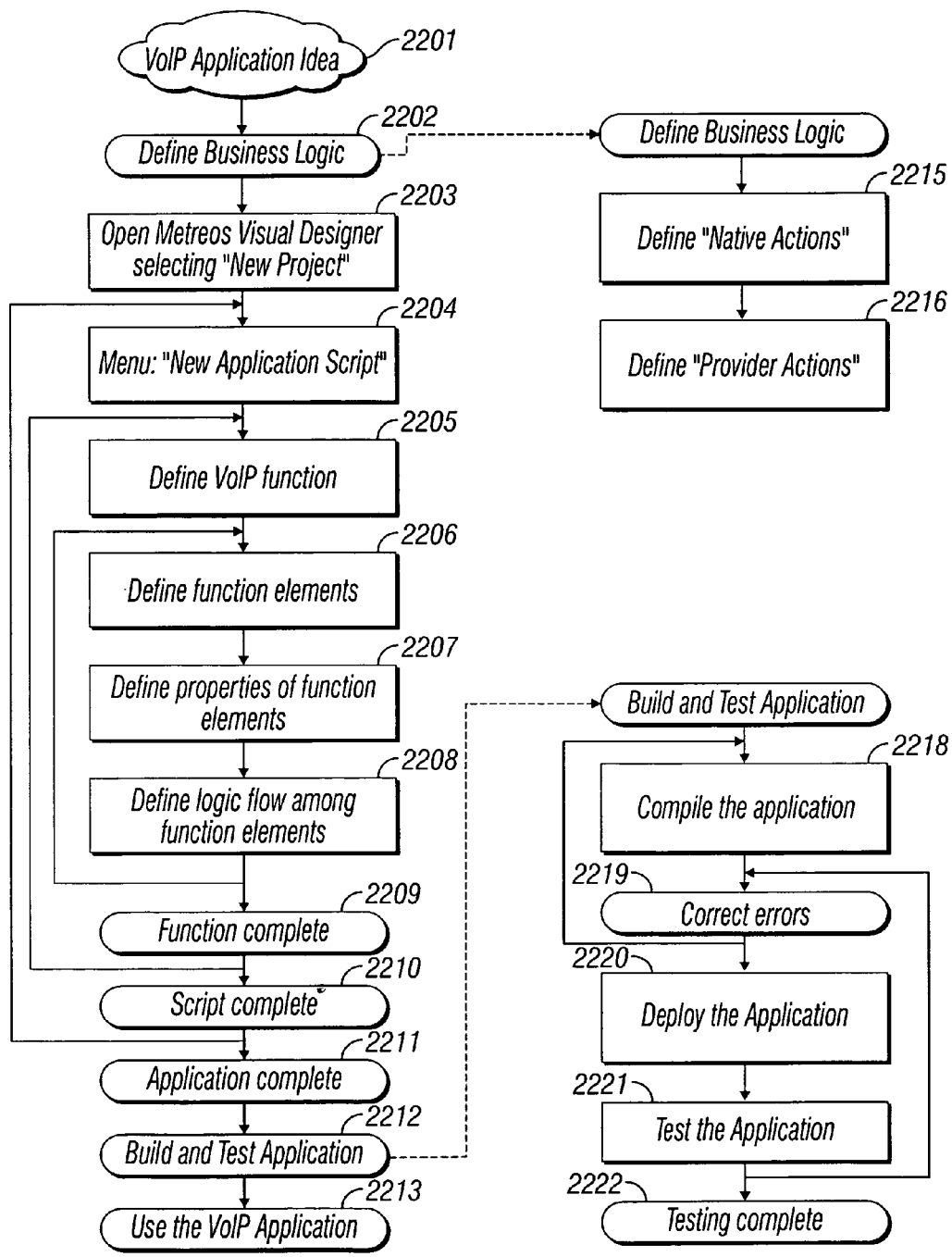
FIG. 22 depicts a flow diagram of a typical usage scenario of a visual designer according to one embodiment of the present invention.

FIG. 22 depicts a flow diagram of a typical usage scenario of a visual designer 16 according to one embodiment of the present invention. Starting with an idea for a new application in step 2201, a user proceeds to define business logic for the application in step 2202. Defining the business logic may include defining Native Actions in step 2215, which includes creating any custom "tools" required by the application 20 and installing a package for each of such tools using a designer's "Add/Remove Packages" menu. Further, a user may define provider actions in step 2216. If necessary, this step defines and installs any custom modules with relationships between an application 20 and the outside world.

In step 2203, the user selects a new project from within visual designer 16. Preferably, visual designer 16 uses a project metaphor to aid developers in organizing applications and applications and application components into a logical system. Creating a new project within the visual designer 16 requires creating a folder on the developer's system or a shared network drive, usually with the same name as the application 20. Within this folder, visual designer 16 stores all the application components. The folder contains files which represent all the scripts 22 used in application 20, the files with configuration and installation data for application 20, and the files containing SQL code for databases required by application 20. After creation of the project, any installed provider and native actions are displayed in Designer's Toolbox. The user may also specify a "triggering event" at this step.

In step 2204, the user constructs a new application script 22. This step further involves dragging and dropping any global variables onto the canvas. In step 2205, the user defines the functionality of the application, which is typically a VoIP application. Other types of applications may also be built with visual designer 16, such as, for example, PSTN telephony applications. Defining functions includes, in step 2206, drag and drop actions and variables from Toolbox onto canvas 202. In step 2207, the user sets properties of each element using the property window 205. In step 2208, the user defines logic flow among the various functional elements. Step 2208 typically involves dragging arrows between elements, visually setting arrows' branch conditions, and dragging and dropping other logical constructs from the Toolbox, such as loops and function calls.

Steps 2206, 2207, and 2208 are iterated for functional elements until the function is complete (step 2209). Additional functions are added by repeating the process until the script is complete (step 2210). Further scripts are added until the application 20 is complete (step 2211).

A completed application is built and tested according to step 2212. In step 2218, to compile the application, the user preferably selects build from the Designer menu, or hits a "build" button. In step 2219, users correct any resulting errors. Deploying the application in step 2220 involves Select "Deploy" from the Designer menu. The application is installed to Application Server 12 by a process described further below. User's may employ debugging capabilities of application server 12 and visual designer 16 to test the application in step 2221.

Figure 23:
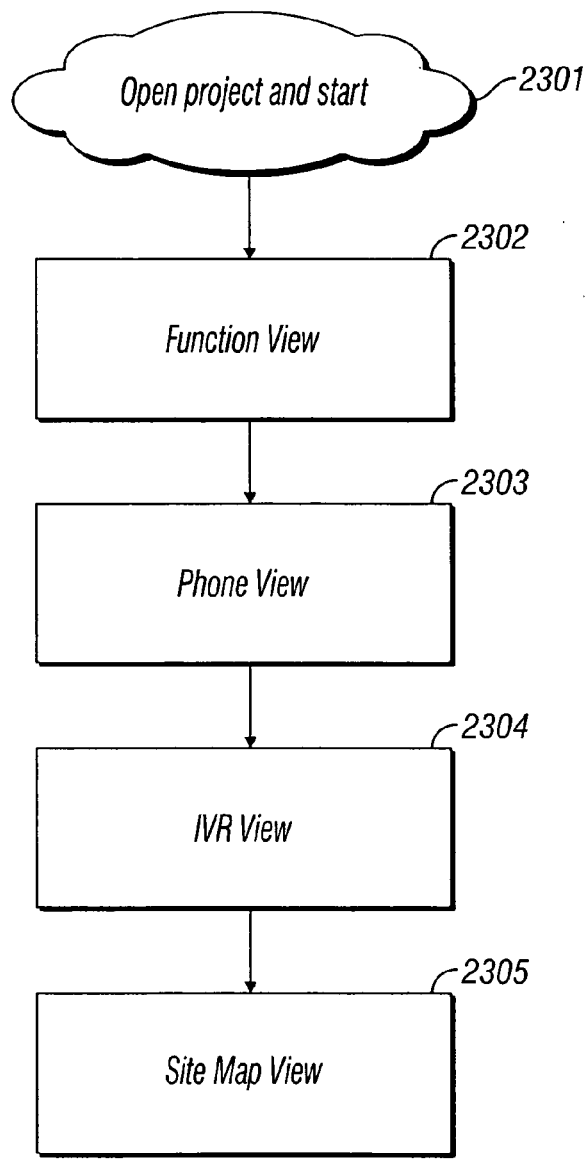
FIG. 23 depicts a flow chart of using multiple view capability to build scripts according to one embodiment of the present invention.

FIG. 23 depicts a flow chart of using a multiple view capability to build scripts 22 according to one embodiment of the present invention. Typically, this capability is used to construct an IP phone application 20 using multiple interchangeable views of the application scripts 22.

In step 2302, in the traditional function view, building blocks are actions, which are dragged from the Toolbox and dropped onto a function canvas as described with reference to FIG. 19 and further with reference to FIG. 22. Logic flow is indicated by dragging arrows between action nodes, and visually setting a branch condition for each such arrow. Transfer of control is specified by dragging from the toolbox to the canvas logical constructs, such as, for example, Call Function, Loop, End Function, Label, Compare, and Switch.

In step 2303, the user may switch to Phone View to see the application as it appears on an IP phone display. User drags graphical building blocks from the toolbox onto the phone view, such as Menu, Softkey, Image, Directory, Button, and Text. Handler functions may be defined for softkeys. The user may then switch to Function View to define the handlers. User interface objects such as images may be visually repositioned and resized. Further, Images, directory text, menu text, button text, etc., may be bound to database content.

In step 2304, the user may switch to IVR (interaction voice response) view. This view allows the user to build an application script by visually specifying call flow through a tree of IVR prompts and menus. Nodes in the tree may be linked to media prompts.

In step 2305, the user may switch to a Site Map View to see and build the mapping between soft keys and application "pages" in VoIP application or other application involving interactive pages.

Figure 24:
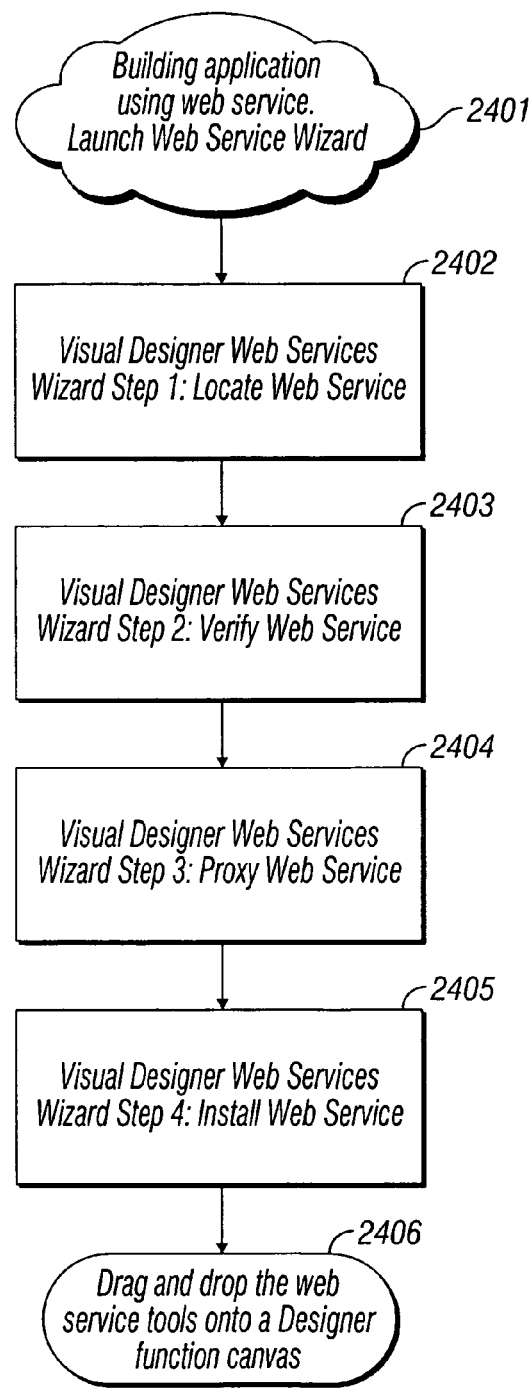
FIG. 24 depicts a flow chart of using a web services integration capability according to one embodiment of the present invention.

FIG. 24 depicts a flow chart of using a web services integration capability according to one embodiment of the present invention. Such a capability is devised to help users incorporate or integrate functionality defined in an existing web service as actions in a visual designer 16 application. Such integrated services may include, for example, the use of a "Do Not Call" registry and the use of a location-based content servers. The user launches a web services wizard in step 2401 to begin integrating a particular web service.

In step 2402, visual designer 16 presents a dialog in which user specifies a URL or path to a remote or local web service description file. If the web service is found, user presses Next to continue.

In step 2403, visual designer 16 presents a dialog in which each method of the located web service is displayed. The user verifies that the methods are as expected, enters a name to describe the web service on the local machined, and presses Next to continue.

In step 2404, visual designer 16 interprets the web service description file, creating a local proxy method for each method in the web service. Visual designer 16 also presents a dialog displaying each method proxied, and solicits the name of a new or existing Designer Toolbox tab under which to insert tools for each such method.

In step 2405, visual designer 16 Designer installs the web service as a Designer Package, and inserts a tool for each proxied method onto the selected Toolbox tab. The user presses Finish to commit changes, or Back to undo changes. Such navigation preferably is available between all steps presented by visual designer 16 as part of the web services wizard.

In step 2406, the user may now use the web services tools by dragging and dropping onto application canvas 202, connecting, and setting properties as described above.

Figure 25:
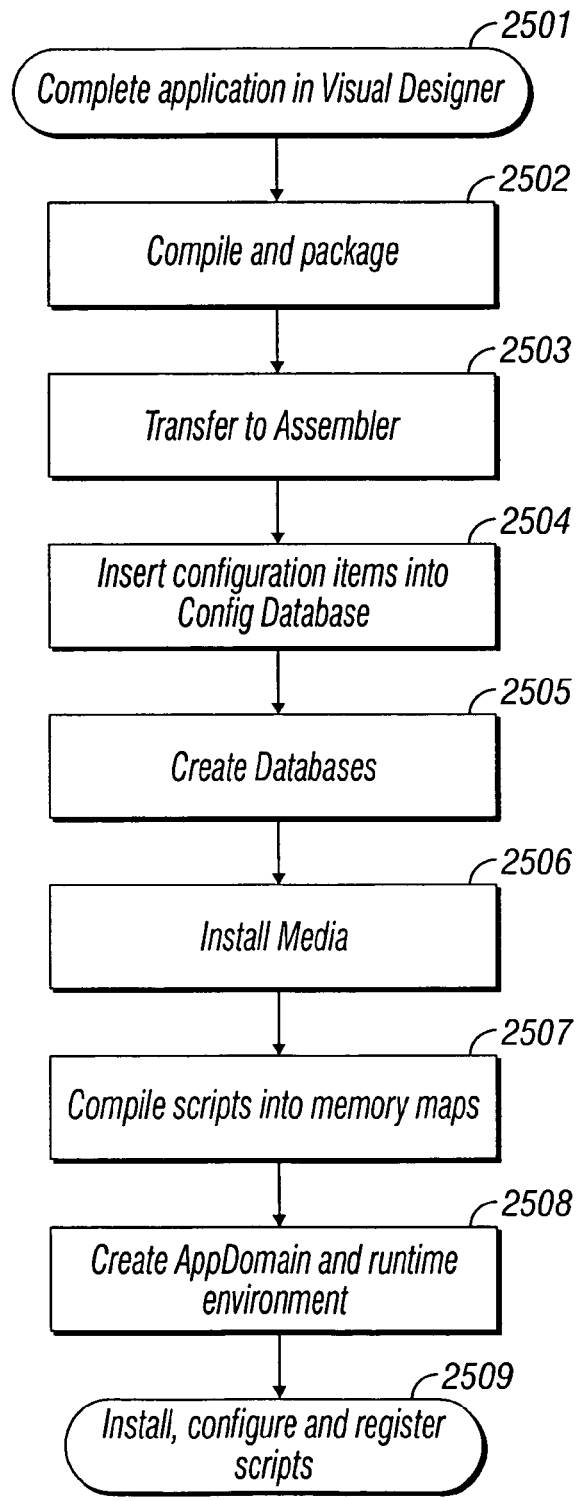
FIG. 25 depicts a flow chart for a process of installing an application on application server according to a preferred embodiment of the present invention.

FIG. 25 depicts a flow chart for a process of installing an application on application server 12 according to a preferred embodiment of the present invention. The installation process is mostly completed by assembler 28. Assembler 28 is responsible for unpackaging applications, compiling them, and creating application runtime AppDomains 21 (FIG. 3). Assembler/application manager 28 also plays a minor role in script debugging by routing the debug commands to the appropriate application.

Applications 20 are usually deployed from visual designer 16. The usual sequence of events is that a developer uses visual designer 16 to create an application 20, packages it, and deploy it to application server 12. When visual designer 16 packages an application 20, it invokes the same static script compiler the Application Server 12 uses just to ensure that there are no errors in the application. Then it locates any custom actions and/or types that the user has linked into this application 20 and zips it all up into one file using the name of the application as the filename and a ".mca" extension (step 2502).

It then connects to Application Server 12, preferably via an application deployment Secure FTP interface, and transfers the archive to the destination MCE 10. (Step 2503). Assembler 28 has a deploy watcher which watches the deployment directory for new files. It is also possible to install a packaged application 20 via the system control panel 18 management website or by direct connection using a standard SFTP client. Use of visual designer 16 is preferred.

Assembler 28 begins by extracting the archive into a temporary directory. Next it checks to see if this application 20 is already installed. If it is, then the existing application 20 is uninstalled and its data prepared for upgrading. Otherwise, it inserts any configuration items that application 20 has defined into the configuration database 310 (step 2504). Such items may then be viewed and modified from the system control panel 18 management website. Next, assembler 28 creates any databases the app has defined (step 2505). Then assembler 28 sends out copies of any media files included in the archive to all configured media servers via SFTP (step 2506).

Assembler 28 next compiles the scripts into memory-maps and creates a new AppDomain 21 and virtual machine/runtime environment 24. Then the default application partitions are created in the configuration database with the dev-time triggering criteria (step 2507). Assembler 28 finishes by feeding the scripts to script pool 19. The virtual machine 24 then registers all the scripts with the Router and the script is ready for execution on application server 12.

Similarly, assembler/application manager 28 responds to requests from the system control panel 18 management website, via the management interface, to uninstall applications. It does so by first sending the virtual machine 24 in question a message telling it to uninstall. Virtual machine 24 responds by notifying router 302 that it is about to be uninstalled and unloading any running scripts. Next, Application Manager 28 deletes the respective AppDomain 21.

Referring in more detail to step 2507 in FIG. 25, script compilation is the process of converting an XML representation of a script 20 into a memory-map object. As described above, a script 20 is a collection of functions which are each a collection of actions. In a preferred embodiment, there are three types of actions and the compiler must handle each type differently as they are encountered: provider actions, native actions, and UserCode actions.

Provider actions are actions in which the XML specifies in plain text strings the name of the action and all the parameters as name-value pairs. To compile a provider action, the assembler 28 has to these strings into a class. The virtual machine 24 will see this at runtime and generate an inter-thread message to send to the designated provider.

A native action is a class which conforms to a well-defined interface which contains an Execute( ) method which will be called directly by the virtual machine 24 at runtime. The parameters and return values of a native action are defined by decorated properties with "set" and "get" accessors as appropriate. Such properties are preferably implemented as a formal .NET or Java construct. MCE 10 includes many native actions to assist developers. Additionally, developers may include custom-built actions by creating a reference to them in visual designer 16. Visual designer 16 then includes these assemblies in the application package. When the assembler sees this, it places them in a "NativeActions" directory under the application install directory.

The compiler locates the assembly containing the action in question using reflection (preferably implemented with .NET or Java), instantiates the action, and stores a reference to it as the entry for this action in the memory-map.

UserCode actions similar to native actions concerning how virtual machine 24 treats them, but instead of the developer providing a pre-compiled assembly with the action code in it, they supply the code itself in un-compiled form as a single function. So assembler 28 creates an in-memory code block (CodeDom) and appends these snippets of code as abstract classes with a single static Execute( ) method as it finds them. When all the actions have been processed, assembler 28 compiler invokes a C# or Java compiler to compile this block of accumulated code. Assembler 28 then goes back to each of the UserCode actions and searches the generated assembly for the compiled functions. As it finds them, it adds method references (MethodInfo) as that respective action's entry in the memory-map.

When the virtual machine 24 encounters UserCode actions, it preferably treats them differently than provider actions. Since the UserCode action is preferably comprised of only a single function, it does not have properties. Thus, the parameters of the Execute( ) method serve as the parameters for the action. The name of the parameter must be a variable name and the type must be correct for that variable. Then the virtual machine 24 passes that variable value into the function. In a preferred embodiment, a UserCode action can only take variables as parameters, there is no way to pass in literals or C# or Java expressions. There are, however, a few special parameters UserCode actions can include to get runtime information or services: "LogWriter log", "int loopIndex", "IEnumerator loopEnum", "IDictionaryEnumerator loopDictEnum", and "SessionData sessionData". Preferably, only one of the loop parameters may be used at a time and it must be the correct one for the type of loop this action is contained in. The other special parameters are preferably always available.

With continuing reference to the assembly process with respect to variables, variable types must be declared. A type, within the context of an MCE 10 application 20, is a class which conforms to a well-defined interface. The class must be capable of being assigned a string, resolving to a string, and being reset. Further, the type may include and publish any number of proprietary methods which are useful for this type.

Like native actions, most common types are included with MCE 10. These types (string, bool, int, etc) preferably behave like native .NET or Java types. These types are preferably implement a different interface which, when encountered, signals the virtual machine 24 to extract their underlying type and use that instead of the artificial wrapper. Developer-built types are referenced in visual designer 16 and packaged in the same way native actions are. Assembler 28 puts developer-built types in a "NativeTypes" directory under the application install directory. When creating a variable of that type, the class for the type is instantiated and a reference is stored in the variable information object which is stored in a "variables" section in the memory-map.

Referring now to assembler 28's handling of action parameters, action parameters can be one of three types: literal, variable, and a code expression (preferably either C# or Java).

If a literal value is specified for an action parameter, virtual machine 24 will pass it as a string if the action is a Provider action. It is the provider 26's responsibility to cast or parse its parameters as necessary. Otherwise virtual machine 24 will attempt to cast or parse is to the required type for a Native action.

A variable action parameter merely identifies the variable who's value should be passed in. The virtual machine 24 will search for the variable by looking first at the function variables, then at the global variables. When it finds the designated variable, it passes the value as it is into the action regardless of whether it is a Provider, Native, or UserCode action.

A C# or Java action parameter is a snippet of code, similar to a UserCode action, except that it can only be a single statement which must resolve to an object. When assembler 28 encounters this, it stubs out a class and a function which initializes all the local and global variables (in addition to the special parameters mentioned for UserCode actions), so they are available to the snippet, and places the snippet just after the "return" statement so it will be evaluated and return with the function. Then, just like a UserCode action, a method reference (MethodInfo) is saved for that action parameter so it can be evaluated later at runtime.

Figure 26:
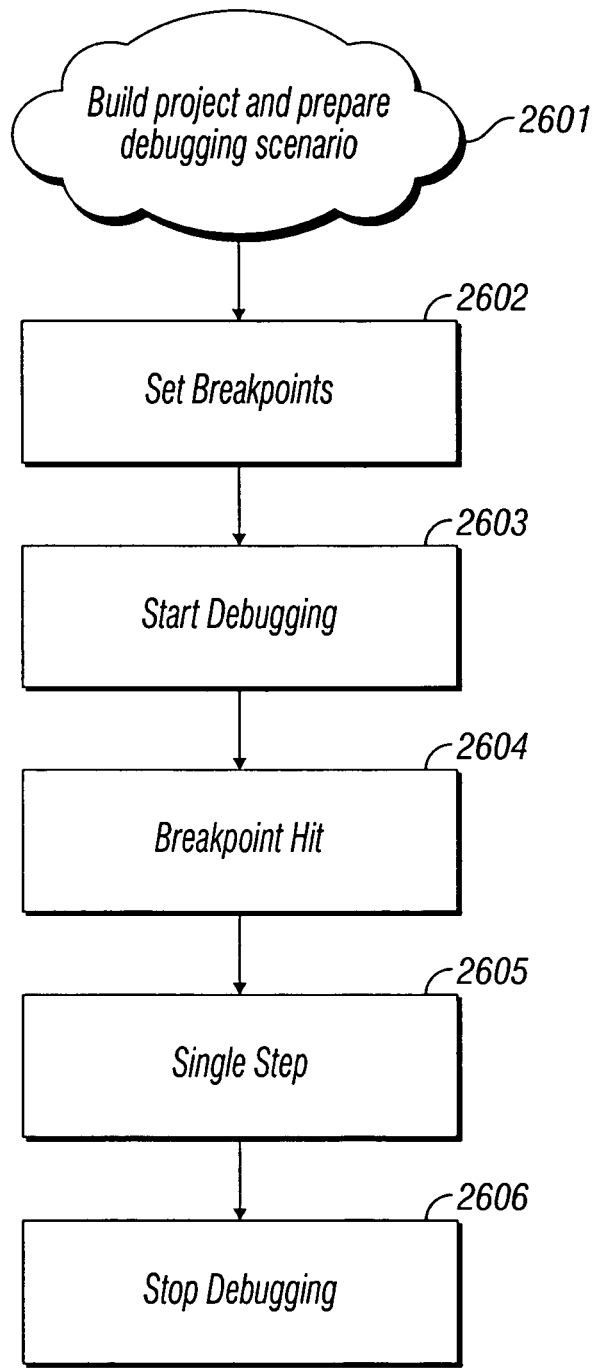
FIG. 26 depicts a flow chart of a debugging process according to one embodiment of the present invention.

FIG. 26 depicts a flow chart of a debugging process according to one embodiment of the present invention. Such a process may be employed when a user wishes to diagnose a visual designer 16 project by visually tracing execution of an application script 20. In step 2602, the user may set one or more breakpoints from either the main menu, or from a context menu on a selected function canvas action node. Enabled breakpoints appear as a red circle next to the action node. Breakpoints may be disabled or cleared in a similar manner.

In step 2603, the user begins debugging of the application script 20 by selecting Start Debugging from a menu, or by pressing the F5 key. The application 20 begins execution in debug mode.

In step 2604, when an action is reached on which a breakpoint has been set and enabled, execution pauses before execution of the action, and a halo is drawn around the action on canvas 202. The state of global variables, and variables local to the current function, are displayed in the Watch window 216. the user selects Continue or Step from a menu to resume execution.

In step 2605, the user can single step from action to action, starting either at the beginning of the application, or at a current break action. Stepping is selected via menu or function key. When stepping, execution pauses at each node visited, and a break halo is drawn around the node on canvas 202. If the action is Call Function, selecting Step Into will single step into the body of the called function. If the user selects Step Over, the function executes and execution pauses at the next action after the function return point.

To stop debugging in step 2606, the user selects Stop Debugging from a menu or function key, and the application exits. The debugging process described herein is merely exemplary and other scenarios and control means may be used.

In a preferred embodiment, application server implements the described debugging capability as follows. Upon receipt of the command to start debugging, visual designer 16 establishes communication to debug module 306 and OAM module 29 on the target application server 12 (FIG. 3).

A debugging session begins when the visual designer 16, acting as a client, sends a StartDebugging command to OAM module 29, acting as a server. When virtual machine 24 gets this message, it creates a new type runtime data structure to handle debug-related state information and associates it with the specified script 20 (not an instance yet). The next time a script 20 of that type starts (becomes a script instance), virtual machine 24 will link the debug information object to it and that script instance will then be in debug mode.

Before debug mode occurs, visual designer 16 user preferably will set some breakpoints. The user does this by simply right-clicking an action in a script and selecting "Set Breakpoint". Visual designer 16 translates such an request into a command and an action ID and sends it to the application server where that information is stored in the debug information object. Application manager 28 preferably routes debug messages.

Table 16 contains a list of possible debugging commands in a preferred embodiment. Breakpoints may be set and cleared at any time. A developer can set all desired breakpoints at once or only set one and once that is reached, set the next one. When virtual machine 24 sees that an action is marked as a breakpoint, it does not execute the action. Instead, it sends a HitBreakpoint command to the connected client. The client may then elect to do any number of things. The client can send a Run command if they wish for execution to continue to the next breakpoint or script end.

TABLE 15

| Client Debugging Commands: |
| --- |
| 1. StartDebugging |
| 2. StopDebugging |
| 3. SetBreakpoint |
| 4. GetBreakpoints |
| 5. ClearBreakpoint |
| 6. Run |
| 7. StepOver |
| 8. StepInto |
| 9. Break |
| 10. Update Value |
| Server Debugging Commands: |
| 1. StopDebugging |
| 2. HitBreakpoint |

The client may send a StepInto or StepOver to execute only one action. The difference between StepOver and StepInto is only made if the action is a CallFunction. StepOver will execute the called function and break on the next action in the current function. StepInto will step into the function an break on the first action. Regardless, of which was chosen, a HitBreakpoint command will be sent to the client along with the state of all the variables and SessionData to indicate that execution has stopped again.

At any time in script execution, the client may issue a Break command. The Break command will cause virtual machine 24 to halt execution at whatever action it is on, and send all the state information, variable values and SessionData information to the client in a HitBreakpoint message. Virtual machine 24 will then wait for further instruction.

While script 20 is paused on an action due to any debug command, the client may elect to send an UpdateValue command. This will cause the value of the specified variable to change to the specified value in that script instance in real time. When script 20 finishes executing, the server will send a StopDebugging command to the client to indicate this. If the client no longer wishes to debug script 20, it may issue a StopDebugging command to the server which will clear any breakpoints and put script 20 back in a running state.

Figure 27:
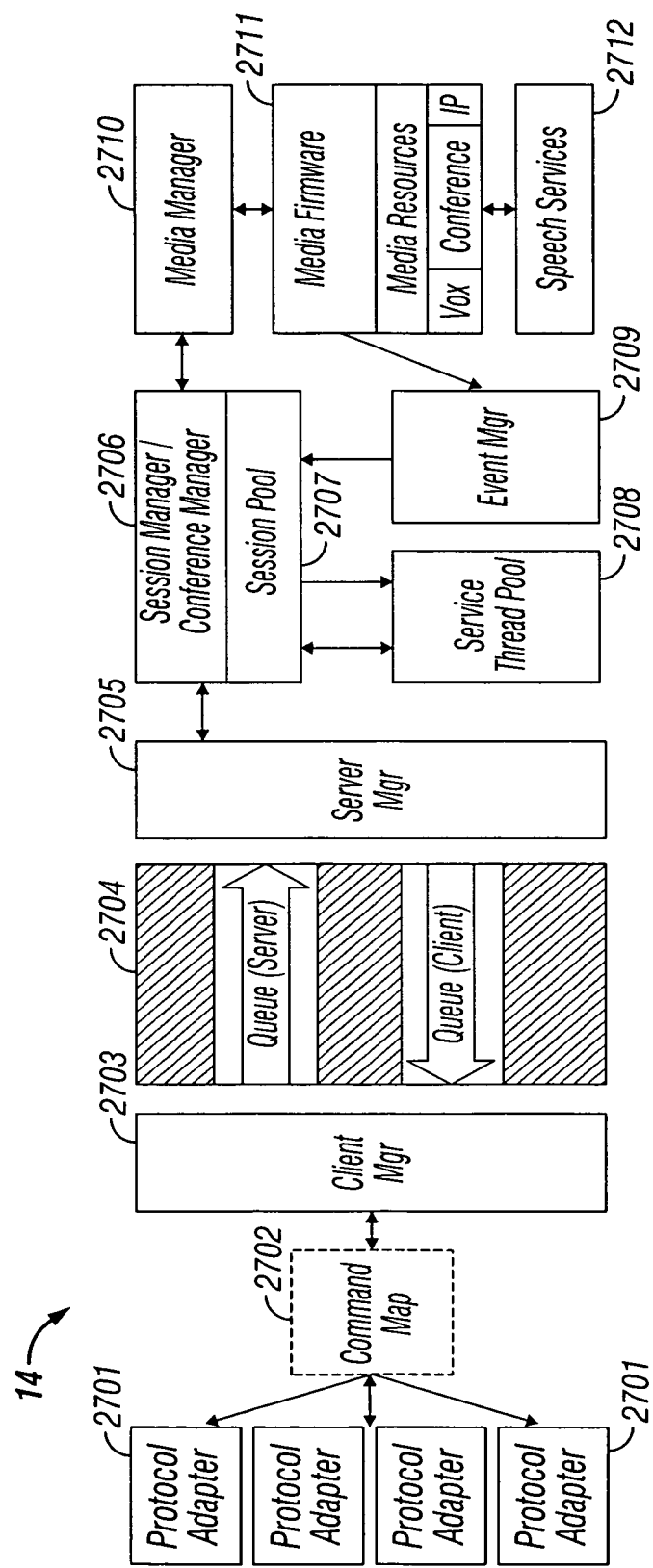
FIG. 27 depicts a block diagram of a media server 14 according to a preferred embodiment of the present invention.

FIG. 27 depicts a block diagram of a media server 14 according to a preferred embodiment of the present invention. Preferably, a media server 14 is used having compatibility with the Intel® Host Media Processing (HMP) software standard. Protocol adapters 2701 handle require for connection and media manipulation services over a variety of protocols, such as, for example, MGCP (Media Gateway Control Protocol), XML, VoiceXML, SIP, Megaco, and JTAPI. Protocol adapters 2701 are preferably extensible to support further protocols.

Command map 2702 is the source of requests to and local sink responses from the remainder of media server 14's architecture. Command map 2702 and protocol adapters 2701 translate media requests to the media server 14's API. Client manager 2703 and server manager 2705 manage media requests through queues 2704. Such a scheme allows a protocol adapter 2701 to leave a request on the server queue 2704 and not be required to wait for a response.

Session manager/conference manager 2706 setup and manage sessions. The session manager observes connection threads, and performs management tasks such as identifying connections which may be in limbo, terminating them to make their connection thread available. The conference manager associates connections with conferences and is responsible for accessing HMP resources to start and terminate conferences, adjust conference parameters, and add and remove connections to and from conferences.

Session pool 2707 and service thread pool 2708 make available a number of threads of execution, each of which may be responsible for handling media firmware service requests and results through media manager 2710 and event manager 2709. Media firmware 2711 interacts with media manager 2710 according to the HMP protocol and provides access to various media resources.

Although the present invention has been described in detail, it will be apparent to those skilled in the art that many embodiments taking a variety of specific forms and reflecting changes, substitutions and alterations can be made without departing from the spirit and scope of the invention. The described embodiments illustrate the scope of the claims but do not restrict the scope of the claims.

The invention claimed is:

1. A method comprising:
generating a markup language file for each of one or more protocol providers including inspecting assemblies that define an interface for each of the one or more protocol providers, each of the protocol providers providing telephony application elements associated with one or more communications protocols, and each of the generated markup language files describing an interface for one of the one or more protocol providers;
generating, based on the generated markup language files, plural element icons, each of the element icons being associated with one of a plurality of telephony application elements described in one of the generated markup language files;
displaying, in a first display environment, the plural generated element icons;
selecting a first one of the plural element icons which is associated with a first one of the plurality of telephony application elements and dragging said first one of the plural element icons to a second display environment where said first one of the plural element icons is displayed as a first node icon and retains its association with the first one of the plurality of telephony application elements;
selecting a second one of the plural element icons which is associated with a second one of the plurality of telephony application elements and dragging said second one of the plural element icons to the second display environment where said second one of the plural element icons is displayed as a second node icon and retains its association with the second one of the plurality of telephony application elements;
defining a relationship between the first one of the plurality of telephony application elements and the second one of the plurality of telephony application elements by graphically linking the first node icon and the second node icon; and
displaying the first node icon and the second node icon and the defined relationship between them to create a diagrammatic depiction of a telephony application being operable in more than one communications protocol.

2. The method of claim 1, further comprising displaying the telephony application as it appears on a display device of a phone interoperable with the telephony application.

3. The method of claim 1, further comprising:
displaying one or more interactive voice response components of the telephony application; and
visually modifying one of the one or more interactive voice response components of the telephony application.

4. The method of claim 1, further comprising translating the diagrammatic depiction of the telephony application into a markup language.

5. The method of claim 1, wherein one or more of the plurality of telephony application elements are actions.

6. The method of claim 5, further comprising incorporating in an action functionality defined in a web service.

7. A visual designer for telephony applications, comprising:
means for generating a markup language file for each of one or more protocol providers including inspecting assemblies that define an interface for each of the one or more protocol providers, each of the protocol providers providing telephony application components associated with one or more communications protocols, and each of the generated markup language files describing an interface for one of the one or more protocol providers;
means for generating, based on the generated markup language files, plural component icons, each of the component icons being associated with a telephony application component described in one of the generated markup language files;
means for displaying in a first display environment the plural generated component icons, each one of the plural component icons being associated with one of a plurality of application components, each one of said plurality of application components being operative to perform a pre-defined function operable under a plurality of different telephony applications;
means for selecting a first one of said plural component icons, said first one of said plural component icons corresponding to a first one of said plurality of application components;
means for displaying in a second display environment a first node icon associated with said first one of said plurality of application components;
means for selecting a second one of said plural component icons, said second one of said plural component icons corresponding to a second one of said plurality of application components;
means for displaying in a second display environment a second node icon associated with said second one of said plurality of application components; and
means for diagrammatically depicting a relationship between said first one of said plurality of application components and said second one of said plurality of application components thereby defining a telephony application operable under a plurality of communications protocols.

8. The visual designer for telephony applications of claim 7, wherein said plurality of application components further comprises at least one web-based application component operative to perform a pre-defined protocol-independent function operable under a plurality of different telephony applications, with the pre-defined protocol-independent function operable under a plurality of different telephony applications of said web-based application-component being provided by a web service.

9. The visual designer for telephony applications of claim 7, further comprising means for expressing in a markup language the relationship between said first one of said plurality of application components and said second one of said plurality of application components.

10. A visual designer comprising:
a computer display;
a pointing device;
a graphic user interface operative to display on the computer display a toolbox display environment and an application display environment;
said toolbox display environment comprising plural toolbox icons, wherein each of the plural toolbox icons is associated with one of a plurality of components operable in a plurality of telephony applications, wherein one or more of the toolbox icons is generated based on one or more markup language files, wherein each markup language file is generated for a protocol provider, wherein each protocol provider provides telephony application components associated with one or more communications protocols, and wherein each of the markup language files describes and is further generated by inspecting assemblies that define an interface for one of the one or more protocol providers;
said pointing device operative to select a first one of said plural toolbox icons, said first one of said plural toolbox icons associated with a first one of said plurality of components, said pointing device further operable to drag said first one of said plural toolbox icons onto said application display environment, whereupon the first one of said plural toolbox icons is displayed as a first node icon in said application display environment, said first node icon being associated with an instance of said first one of said components;
said pointing device further operative to select a second one of said plural toolbox icons, said second one of said plural toolbox icons associated with a second one of said plurality of components, said pointing device further operable to drag said second one of said plural toolbox icons onto said application display environment, whereupon the second one of said plural toolbox icons is displayed as a second node icon in said application display environment, said second node icon being associated with an instance of said second one of said plurality of components; and
said pointing device further operative to define a relationship between said instance of said first one of said plurality of components and said instance of said second one of said plurality of components by graphically dragging an arrow from said first node to said second node, thereby graphically defining a telephony application.

11. A non-transitory computer-readable medium storing computer executable-instructions for performing:
generating a markup language file for each of one or more protocol providers including inspecting assemblies that define an interface for each of the one or more protocol providers, each of the protocol providers providing telephony application elements associated with one or more communications protocols, and each of the generated markup language files describing an interface for one of the one or more protocol providers;
generating, based on the generated markup language files, plural element icons, each of the element icons being associated with one of a plurality of telephony application elements described in one of the generated markup language files;
displaying, in a first display environment, the plural generated element icons;
selecting a first one of the plural element icons which is associated with a first one of the plurality of telephony application elements and dragging said first one of the plural element icons to a second display environment where said first one of the plural element icons is displayed as a first node icon and retains its association with the first one of the plurality of telephony application elements;
selecting a second one of the plural element icons which is associated with a second one of the plurality of telephony application elements and dragging said second one of the plural element icons to the second display environment where said second one of the plural element icons is displayed as a second node icon and retains its association with the second one of the plurality of telephony application elements;
defining a relationship between the first one of the plurality of telephony application elements and the second one of the plurality of telephony application elements by graphically linking the first node icon and the second node icon; and
displaying the first node icon and the second node icon and the relationship between them to create a diagrammatic depiction of a telephony application, said telephony application being operable in more than one communications protocol.

12. The medium of claim 11, further storing computer executable-instructions for performing displaying the telephony application as it appears on a display device of a phone interoperable with the telephony application.

13. The medium of claim 11, further storing computer executable-instructions for performing:
displaying one or more interactive voice response components of the telephony application; and
visually modifying one of the one or more interactive voice response components of the telephony application.

14. The medium of claim 11, further storing computer executable-instructions for performing translating the diagrammatic depiction of the telephony application into a markup language.

15. The medium of claim 11, wherein one or more of the plurality of telephony application elements are actions.

16. The medium of claim 15, further storing computer executable-instructions for performing incorporating in an action functionality defined in a web service.

* * * * *

UNITED STATES PATENT AND TRADEMARK OFFICE
CERTIFICATE OF CORRECTION

PATENT NO. : 8,687,789 B2
APPLICATION NO. : 11/449283
DATED : April 1, 2014
INVENTOR(S) : Marascio et al.

Page 1 of 1

It is certified that error appears in the above-identified patent and that said Letters Patent is hereby corrected as shown below:

In the specification,

In column 25, line 49, please amend as follows:
in Table 11. The function name, and optionally, its parameters and

Signed and Sealed this
Seventeenth Day of November, 2015

Michelle K. Lee
*Director of the United States Patent and Trademark Office*